United States Patent
Kwon et al.

(10) Patent No.: US 6,587,451 B1
(45) Date of Patent: Jul. 1, 2003

(54) SMART ANTENNAS FOR IMT-2000 CODE DIVISION MULTIPLE ACCESS WIRELESS COMMUNICATIONS

(75) Inventors: Hyuck-M. Kwon, Wichita, KS (US); Yoo-Seung Song, Youngjoo (KR)

(73) Assignee: SK Telecom Co., Ltd., Seoul (KR)

( * ) Notice: Subject to any disclaimer, the term of this patent is extended or adjusted under 35 U.S.C. 154(b) by 177 days.

(21) Appl. No.: 09/709,427

(22) Filed: Nov. 13, 2000

Related U.S. Application Data

(60) Provisional application No. 60/164,552, filed on Nov. 10, 1999.

(51) Int. Cl.$^7$ ................................................ H04H 1/00
(52) U.S. Cl. ...................... 370/339; 370/442; 370/465; 455/276.1
(58) Field of Search ................................. 370/329–335, 370/339, 342, 441, 465; 375/136, 324, 346; 455/276.1; 342/378

(56) References Cited

U.S. PATENT DOCUMENTS 6,434,375 B1 * 8/2002 Chulajata et al. ......... 455/276.1
6,462,709 B1 * 10/2002 Choi ........................ 342/378

* cited by examiner

*Primary Examiner*—Hassan Kizou
*Assistant Examiner*—John Pezzlo
(74) *Attorney, Agent, or Firm*—Lowe Hauptman Gilman & Berner, LLP

(57) ABSTRACT

A method of generating a weight vector based on the maximum signal-to-interference-plus-noise output power ratio (SINR0) criteria without an eigenvector finding technique, is provided for use in a smart antenna system. The weight vector is applied after pseudo noise (PN) despreading rather than in front of a receiver for channel estimation and data symbol demodulation. The method includes setting an initial weight vector w(0) and a convergence parameter or an initial eigenvalue. New post-PN processing vectors y(i) and new pre-PN processing vectors x(i) are received. The weight vector w(k) at a snapshot k is then updated and optimized.

10 Claims, 28 Drawing Sheets

FIG. 18

| M | $G_{avg,Re} \equiv E[\text{Re}^2(\underline{w}^H(\theta_1)\underline{a}(\theta_j))]$ | $G_{avg,Im} \equiv E[\text{Im}^2(\underline{w}^H(\theta_1)\underline{a}(\theta_j))]$ | $G_{avg,Re} + G_{avg,Im}$ |
|---|---|---|---|
| 3 | 0.2716 | 0.1136 | 0.3852 |
| 5 | 0.1594 | 0.0890 | 0.2484 |
| 10 | 0.0811 | 0.0558 | 0.1369 |

FIG. 19

| N | Practical Modeling $\sum_{n=1}^{N-1} I_n e^{-j\pi(m-1)\sin\theta_n}$ | | | | Simplified Modeling $I\, e^{-j\pi(m-1)\sin\theta}$ | | | | Difference | | | |
|---|---|---|---|---|---|---|---|---|---|---|---|---|
| | Real | | Imag. | | Real | | Imag. | | Real | | Imag. | |
| | Mean | Var. | Mean | Var. | Mean | Var. | Mean | Var. | Mean | Var. | Mean | Var. |
| 10 | -0.0025 | 2.6780 | -0.0006 | 1.6147 | -0.0007 | 2.4702 | 0.0012 | 1.9746 | 0.0018 | 0.2078 | 0.0006 | 0.3599 |
| 30 | -0.0004 | 4.4138 | -0.0013 | 3.2278 | 0.0006 | 4.2795 | 0.0022 | 3.4210 | 0.0002 | 0.1343 | 0.0009 | 0.1932 |
| 50 | 0.0006 | 5.6510 | -0.0045 | 4.2208 | 0.0026 | 5.5259 | -0.0022 | 4.4113 | 0.0020 | 0.1251 | 0.0023 | 0.1905 |
| 70 | -0.0030 | 6.5025 | -0.0009 | 5.2588 | -0.0056 | 6.5329 | 0.0056 | 5.2226 | 0.0026 | 0.0304 | 0.0047 | 0.0362 |

FIG. 20

| | M | | 10 Users | 30 Users | 50 Users | 70 Users |
|---|---|---|---|---|---|---|
| Conventional antennas | 1 | Theoretical Results | 0.0294 | 0.1068 | 0.1591 | 0.1955 |
| | | Simulation Results | 0.0272 | 0.1072 | 0.1642 | 0.2060 |
| | 3 | Theoretical Results | 0.0285 | 0.1061 | 0.1587 | 0.1952 |
| | | Simulation Results | 0.0273 | 0.1060 | 0.1670 | 0.2050 |
| | 10 | Theoretical Results | 0.0281 | 0.1059 | 0.1585 | 0.1951 |
| | | Simulation Results | 0.0265 | 0.1067 | 0.1644 | 0.2052 |
| Smart antennas | 3 | Theoretical Results | 0.0069 | 0.0379 | 0.0690 | 0.0690 |
| | | Max. Output | 0.0077 | 0.0432 | 0.0819 | 0.1115 |
| | | Max. SINR | 0.0091 | 0.0506 | 0.0927 | 0.1187 |
| | | Max. SINR w/o Eigen. | 0.0082 | 0.0454 | 0.0861 | 0.1253 |
| | | Simp. Max. SINR w/o Eigen. | 0.0145 | 0.0496 | 0.0899 | 0.1562 |
| | 10 | Theoretical Results | 0.0013 | 0.0090 | 0.0194 | 0.0303 |
| | | Max. Output | 0.0025 | 0.0119 | 0.0284 | 0.0463 |
| | | Max. SINR | 0.0019 | 0.0112 | 0.0265 | 0.0526 |
| | | Max. SINR w/o Eigen. | 0.0024 | 0.0120 | 0.0256 | 0.0430 |
| | | Simp. Max. SINR w/o Eigen. | 0.0031 | 0.0145 | 0.0307 | 0.0497 |

FIG. 21

| | M | | 10 Users | 30 Users | 50 Users | 70 Users |
|---|---|---|---|---|---|---|
| Conventional antennas | 1 | Theoretical Results (L=2) | 0.0294 | 0.1068 | 0.1591 | 0.1955 |
| | | Theoretical Results (L=1) | 0.0600 | 0.1388 | 0.1863 | 0.2190 |
| | | Simulation Results | 0.0420 | 0.1275 | 0.1835 | 0.2202 |
| | 3 | Theoretical Results (L=2) | 0.0285 | 0.1061 | 0.1587 | 0.1952 |
| | | Theoretical Results (L=1) | 0.0588 | 0.1382 | 0.1859 | 0.2187 |
| | | Simulation Results | 0.0400 | 0.1290 | 0.1813 | 0.2208 |
| | 10 | Theoretical Results (L=2) | 0.0281 | 0.1059 | 0.1585 | 0.1951 |
| | | Theoretical Results (L=1) | 0.0584 | 0.1380 | 0.1858 | 0.2196 |
| | | Simulation Results | 0.0406 | 0.1274 | 0.1814 | 0.2210 |
| Smart antennas | 3 | Theoretical Results (L=2) | 0.0069 | 0.0379 | 0.0690 | 0.0690 |
| | | Theoretical Results (L=1) | 0.0256 | 0.0691 | 0.1020 | 0.1282 |
| | | Max. Output | 0.0149 | 0.0607 | 0.1086 | 0.1401 |
| | | Max. SINR | 0.0148 | 0.0598 | 0.1063 | 0.1420 |
| | | Max. SINR w/o Eigen. | 0.0179 | 0.0622 | 0.1056 | 0.1425 |
| | | Simp. Max. SINR w/o Eigen. | 0.0230 | 0.0718 | 0.1209 | 0.1797 |
| | 10 | Theoretical Results (L=2) | 0.0013 | 0.0090 | 0.0194 | 0.0303 |
| | | Theoretical Results (L=1) | 0.0095 | 0.0279 | 0.0440 | 0.0582 |
| | | Max. Output | 0.0053 | 0.0285 | 0.0569 | 0.0867 |
| | | Max. SINR | 0.0051 | 0.0276 | 0.0594 | 0.0795 |
| | | Max. SINR w/o Eigen. | 0.0062 | 0.0206 | 0.0424 | 0.0606 |
| | | Simp. Max. SINR w/o Eigen. | 0.0090 | 0.0250 | 0.0492 | 0.0686 |

FIG. 22

| | | | 10 Users | 30 Users | 50 Users | 70 Users |
|---|---|---|---|---|---|---|
| Conventional antennas | 1 | Theoretical Results (L=2) | 0.0294 | 0.1068 | 0.1591 | 0.1955 |
| | | Theoretical Results (L=1) | 0.0600 | 0.1388 | 0.1863 | 0.2190 |
| | | Simulation Results | 0.0420 | 0.1275 | 0.1835 | 0.2202 |
| | 3 | Theoretical Results (L=2) | 0.0285 | 0.1061 | 0.1587 | 0.1952 |
| | | Theoretical Results (L=1) | 0.0588 | 0.1382 | 0.1859 | 0.2187 |
| | | Simulation Results | 0.0400 | 0.1290 | 0.1813 | 0.2208 |
| | 10 | Theoretical Results (L=2) | 0.0281 | 0.1059 | 0.1585 | 0.1951 |
| | | Theoretical Results (L=1) | 0.0584 | 0.1380 | 0.1858 | 0.2196 |
| | | Simulation Results | 0.0406 | 0.1274 | 0.1814 | 0.2210 |
| Smart antennas | 3 | Max. Output | 0.0069 | 0.0379 | 0.0690 | 0.0690 |
| | | Max. SINR | 0.0256 | 0.0691 | 0.1020 | 0.1282 |
| | | Max. SINR w/o Eigen. | 0.0151 | 0.0676 | 0.1043 | 0.1335 |
| | | | 0.0300 | 0.1162 | 0.1733 | 0.2353 |
| | | Simp. Max. SINR w/o Eigen. | 0.0130 | 0.0540 | 0.0953 | 0.1220 |
| | | | 0.0142 | 0.0785 | 0.1180 | 0.1399 |
| | 10 | Max. Output | 0.0013 | 0.0090 | 0.0194 | 0.0303 |
| | | Max. SINR | 0.0095 | 0.0279 | 0.0440 | 0.0582 |
| | | Max. SINR w/o Eigen. | 0.0105 | 0.0482 | 0.0712 | 0.1003 |
| | | | 0.0385 | 0.1240 | 0.1761 | 0.2172 |
| | | Simp. Max. SINR w/o Eigen. | 0.0149 | 0.0481 | 0.0931 | 0.1008 |
| | | | 0.0088 | 0.0826 | 0.1017 | 0.1167 |

SMART ANTENNAS FOR IMT-2000 CODE DIVISION MULTIPLE ACCESS WIRELESS COMMUNICATIONS

This application claims the benefit of Provisional No. 60/164,552 filed Nov. 10, 1999.

TECHNICAL FIELD OF THE INVENTION

This invention relates in general to the field of wireless communications, and more particularly to development of smart antennas for code division multiple access wireless communications.

BACKGROUND OF THE INVENTION

Most of beam-forming techniques have been designed for Global Systems for Mobile communications (GSM) and time-division multiple access (TDMA)-based cellular systems described in articles by: M. Viberg et al., "Sensor Array Processing Based on Subspace Fitting," *IEEE Trans. on Acoustics, Speech, Signal Processing*, vol. ASSP-39, no. 5, pp. 1110–1121, May 1991; M. Taferner et al., "A Novel DOA-Based Beamforming Algorithm with Broad Nulls," *International Symposium on Personal, Indoor and Mobile Radio Communication'99*, Osaka, Japan, September 1999; A. Kuchar and et al., "Real-Time Smart Antenna Processing for GSM1800 Base Station," IEEE Vehicular Technology Conference'99, Houston, Tex., May 16–20, 1999; A. Kuchar et al., "A Robust DOA-based Smart Antenna Processing for GSM Base Stations," *IEEE International Conference on Communications'99*, Vancouver, Jun. 6–10, 1999; J. H. Winters, "Signal Acquisition and Tracking with Adaptive Arrays in Digital Mobile Radio Systems IS-54 with Flat Fading," *IEEE Transactions on Vehicular Technology*, vol. VT-42, no. 4, pp. 377–384, July 1993; J. H. Winters et al., "The Impact of Antenna Diversity on the Capacity of Wireless Communication Systems," *IEEE Transactions on Communications*, vol. COM-41, no. 4, pp. 1740–1751, April 1994; J. Razavilar et al., "Software Radio Architecture with Smart Antennas: A Tutorial on Algorithms and Complexity," *IEEE Journal on Selected Areas in Communications*, vol. 17, no. 4, pp. 662–676, April 1999; S. Anderson et al., "An Adaptive Array for Mobile Communication Systems," *IEEE Transactions on Vehicular Technology*, vol. VT-40 (1), pp. 230–236, February 1991; S. Talwar et al., "Blind Estimation of Multiple Co-Channel Digital Signals Using an Antenna Array," *IEEE Signal Processing Letters*, vol. (1)–2, pp. 29–31, February 1994; and L. Tong et al., "Waveform-Preserving Blind Estimation of Multiple Independent Sources," *IEEE Transactions on Acoustics, Speech, Signal Processing*, vol. ASSP-41, no. 7, pp. 2461–2470, July 1993. The beam-forming techniques are not suitable for direct sequence (DS) code division multiple access (CDMA) systems because of the following reasons. First, all users in a CDMA wireless system are co-channel and their number could easily exceed the number of antennas. Moreover, due to multi-path propagation and the fact that each transmission path may contain direct, reflected and diffracted paths at different time delays, the array manifold may be poorly defined. Therefore, direction-finding-based beam-forming techniques may be difficult to apply. Also, no training or reference signals are present in the mobile to the base station link. Therefore, reference-signal based techniques cannot be used.

A smart antenna is defined to be an adaptive antenna array with a blind technique. It does not require any training signals or prior spatial information. Recently, a technique for estimating the vector channel and the corresponding adaptive beam-former has been developed for CDMA wireless systems as described in articles by: Ayman F. Naguib et al., "Performance of Wireless CDMA with M-ary Orthogonal Modulation and Cell Site Antenna Arrays," *IEEE Journal on Selected Areas in Communications*, Vol. 14, No. 9, pp. 1770–1783, December 1996; and Arogyaswami J. Paulraj et al., "Space-Time Modems for Wireless Personal Communications," *IEEE Personal Communications*, Vol. 5, No. 1, pp. 36–48, February 1998. In this technique, a code-filtering method is performed at each antenna for every finger (a parallel receiver to isolate multi-path components from the desired user in the system). The eigenstructure of the pre- and post-correlation array covariance matrices is used to estimate the channel vector and derive the corresponding adaptive beam-former. This technique was extended to the case of multi-path propagation using RAKE finger. The resulting overall receiver structure is called Beam-former-RAKE. The Beam-former-RAKE is a blind technique since it does not require any training signals, although it does assume the perfect knowledge of the spreading code for each finger of each user. It does not require any assumptions on the signal propagation and is, therefore, suitable for different propagation settings.

When the signal environment frequently changes because of the desired and undesired non-stationary signals, the adaptive beam-former must continuously update the weight vector to match the changing environment. The adaptive algorithms in the article by Ayman F. Naguib et al. are based on generalized eigenvector and an eigenvalue finding method, and are designed to maximize signal-to-interference-plus-noise output power ratio ($SINR_0$). Although the smart antennas in the article by Ayman F. Naguib et al. show significant improvement in bit error rate (BER) performance compared to other existing smart antennas, they require enormous amounts of computation, and have not been simple to apply in practical fields. These heavy computations are due to the calculations of eigenvalues and eigenvectors of M×M auto-covariance matrices for the antenna array outputs.

As mentioned in an article by Maggie Dunham et. al., "Tetherless T3 and Beyond", Interim Report, National Science Foundation Workshop on Nov. 19–20, 1998 (Available at the URL:http://www.cudenver.edu/public/engineer/T3-Workshop/T3Report-12-98.html) for tetherless T3 and beyond wireless communications, "Fast Protocols/Algorithms" are needed for "Temporally-Spatially Varying Channels." Simple smart antennas based on maximum output power instead of maximum $SINR_0$ were introduced in articles by D. Shim et al., "A New Blind Adaptive Algorithm Based on Lagrange's Formula for a Smart Antenna System in CDMA Mobile Communications," *IEEE Vehicular Technology Conference*, pp. 1160–1664, Ottawa, May 1998; Yoo S. Song et al., "Simple Analysis of a Simple Smart Antenna for CDMA Wireless Communications," *IEEE Vehicular Technology Conference*, Houston, Tex., pp. 254–258, May 16–20, 1999; and Yoo S. Song et al., "Analysis of a Simple Smart Antenna for Code Division Multiple Access Wireless Communications," submitted to the *IEEE Journal on Selected Area in Communications*, June 1999, to significantly reduce the number of computations. The research in the article by D. Shim et al. shows performance similar to results in articles Yoo S. Song et al. However, the maximum output power criteria in the article by D. Shim et al. employs a Lagrange multiplier method and introduces slightly higher computational loads (5.5M compared to 4M in the articles by Yoo S. Song et al.). The maximum output power criteria may yield an adaptive and effective antenna weighting vector if the spread spectrum processing gain is high enough (e.g., 21 dB in the IS-95 CDMA systems). The received multi-path strength may not be equal in practice. A weak point of these algorithms are that the optimum weight vector for a weak path signal can track an undesired user or strong path signal direction if the power of the undesired signal after PN de-spreading is strong or if signal-to-interference input power ratio ($SIR_i$) is low.

In a future CDMA wireless communications system low $SIR_i$ operation is more important than high $SIR_i$. It is desirable to develop a smart antenna algorithm, which not only maximizes the SINR but also has smaller computation loads. In this invention two such smart antenna algorithms are invented and compared with the existing smart antenna with eignevector finding in the article by Ayman F. Naguib et al. and one based on the maximum output power criteria in the articles by Yoo S. Song et al. Two of four algorithms only require computational loads of the order 4M per snapshot where M is the number of antennas in a sector at a base station. The other invented algorithm requires computational loads of order $4M+2M^2$, and is based on the maximum $SINR_O$ criteria. All three algorithms do not require any computation of eigenvalue and eigenvectors. All three smart antenna weight vectors are applied after post-PN processing as in the article by Ayman F. Naguib et al. to exploit the advantage of the DS-CDMA system over other time division multiple access (TDMA) or frequency division multiple access (FDMA) systems. Bit error rate (BER) versus the number of users are analyzed and simulated.

SUMMARY OF INVENTION

Cross pseudo-noise (PN) spreading and de-spreading and pilot-aided channel estimation in the cdma2000 reverse link are some of major different characteristics from the IS-95 code division multiple access (CDMA) wireless communications systems. These different features are included in this invention. Then, three simple smart antenna algorithms without eigenvector findings are presented for future high-speed high performed low-cost direct-sequence CDMA wireless communications systems, and compared with a conventional smart antenna with an eigenvector finding. Two only require computational loads of the order 4M per snapshot where M is the number of antennas in a sector at a base station. The other algorithm requires computational loads of order $4M+2M^2$. Two of them are based on the maximum signal-to-interference-plus-noise output power ratio ($SINR_O$) criteria as the conventional algorithm, and one is based on the maximum output power criteria. All three simple smart antennas are for temporal and spatial varying channels. The conventional smart antennas require order larger than $M^2$ due to generalized eigenvector finding and are difficult and costly to implement. Both equal and unequal strength Jake fading channels are employed. Both a scattered and a cluster interference model are considered. The bit (code symbol) error rate (BER) of the CDMA systems with the smart antennas are analyzed, simulated, and compared with those of the existing one. It is observed that the two simple smart antennas of order 4M may perform better than the existing one under unequal strength fading environment and/or a cluster of interfering users. In general, the other simple smart antenna algorithm of order $2M^2+4M$ based on the maximum SINR criteria without eigenvector finding shows the best performance out of four smart antennas considered. Appendix provides the MATLAB program source codes, which were used to verify the invention claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which:

FIG. 18 is a table listing the average angle gain with respect to the incident angle $\theta_1$ of the desired signal;

FIG. 19 is a table showing the comparison of the practical and the simplified interference model;

FIG. 20 is a table 3 lists bit error rate under equal strength channel (0.5, 0.5), L=2, and $E_b/N_0$=20 dB;

FIG. 21 is a table listing bit error rate under unequal strength channel (0.9, 0.1), L=2, and $E_b/N_0$=20 dB; and FIG. 22 is a table listing bit error rate under unequal strength channel (0.9, 0.1), L=2, $E_b/N_0$=20 dB, and cluster of interference.

DETAILED DESCRIPTION OF THE PREFERRED EMBODIMENTS

System Models

Figure 1:
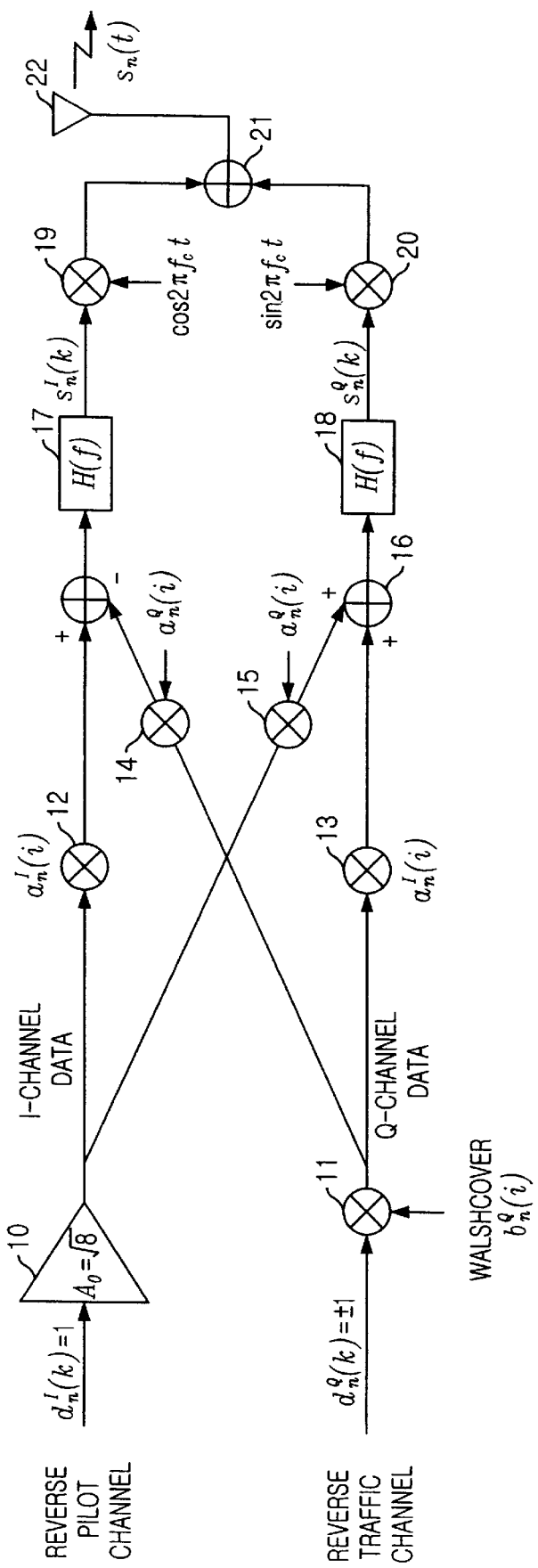
FIG. 1 is a block diagram of a complex PN-spreading based on configuration 3 of a cdma2000 reverse link employing a method in accordance with the present invention.

FIG. 1 shows a complex PN spreading based on configuration 3 of a cdma2000 (i.e., 3G CDMA) reverse link described in TIA, Interim V&V Text for cdma2000 Physical Layer (Revision 8.3), Mar. 16, 1999. The input data stream $d_n{}^I(k)$ in the pilot channel is 1 and the input data stream $d_n{}^Q(k)$ in a traffic channel is a random sequence of ±1 where k denotes a code symbol index. A Symbol rate is assumed equal to a smart antenna weight vector adaptation rate (i.e., a snapshot rate). A pilot amplitude $A_0$ is chosen to $\sqrt{8}$ times that of a reverse traffic channel according to the specification in the Revision 8.3. The pilot and traffic channels are multiplied with the orthogonal Walsh codes $b_n{}^I(i)$=1 and $b_n{}^Q(i)$=±1 alternating sequence, respectively. The in-phase (I) and quadrature-phase (Q) data are PN spread with $a_n(i)=a_n{}^I(i)+ja_n{}^Q(i)$ by using multiplexers 11–16. The PN spread signal can be written as $\{A_0 d_n{}^I(k)b_n{}^I(i)+jd_n{}^Q(k)b_n{}^Q(i)\}(a_n{}^I(i)+ja_n{}^Q(i))=\{A_0+jd_n{}^Q(k)b_n{}^Q(i)\}(a_n{}^I(i)+ja_n{}^Q(i))$ where i and k denote chip and code symbol (or snapshot) index, respectively. The equivalent lowpass I and Q components after the baseband filters H(f) 17 and 18 are denoted as $s_n{}^I(t)+js_n{}^Q(t)$. The transmitted signal $s_n(t)$ from user n through two multipliers 19 and 20 and an antenna 22 is written as:

$$s_n(t)=Re\{\sqrt{P}(s_n{}^I(t)+js_n{}^Q(t))e^{j2\pi f_c t}\}(k-1)T_c \leq t < kT_c \quad (1)$$

where P is a transmitted power. A Jake fading model is used for each multi-path for a given mobile velocity and carrier frequency described in a book by W. C. Jakes, Jr. Ed., Microwave Mobile Communications, Wiley, 1974.

Figure 2:
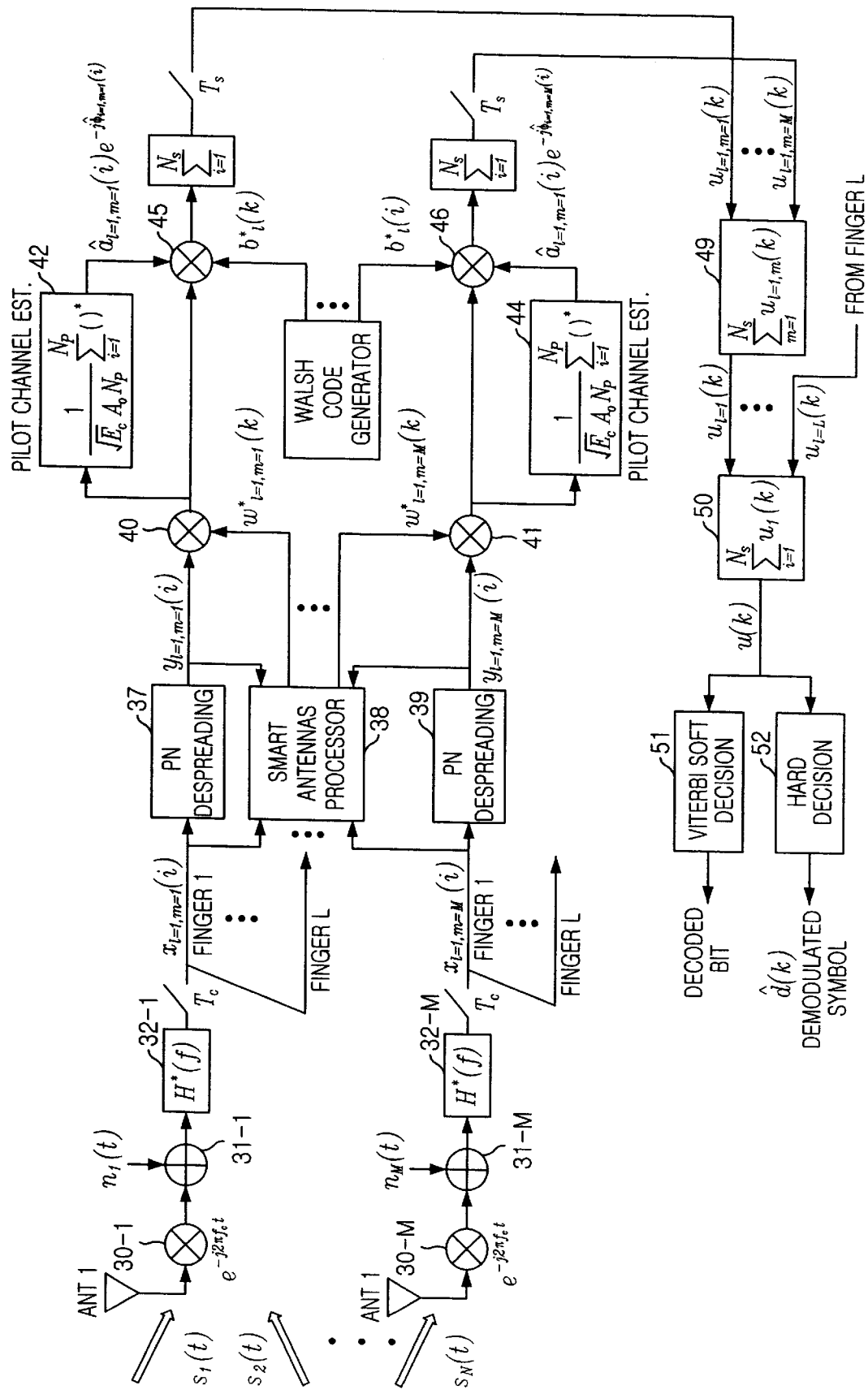
FIG. 2 is an schematic overall block diagram of a receiver with a smart antenna processor for the cdma2000 reverse link employing the method in accordance with the present invention.

FIG. 2 shows an overall block diagram of a receiver with a smart antenna processor for the cdma2000 reverse link in accordance with the present invention. It is assumed that the directions of arrival angle (DOA) from N users are independent random variables and also the DOAs of L multi-path signals from the same mobile user are independent. The antenna spacing d in a linear array of M antennas is chosen to be $\lambda/2$ where $\lambda$ is the wavelength equal to $c/f_c$ for a given carrier frequency $f_c$ and light speed $c=3\times10^8$ m/s. It is assumed that the array antennas are identical and have the same response to any direction. The identical signals are received by all antennas and the M antenna output signals are equal except the spatial phase difference $e^{-2\pi(m-1)(d\sin\theta)/\lambda}=e^{-j\pi(m-1)\sin\theta}$, m=1, . . . , M where a plane wave from the desired signal impinges upon the array at an angle $\theta$ with respect to the array normal. The antenna array response vector $a(\theta)$ can be written as:

$$a(\theta)=[1 e^{-j\pi\sin\theta} \ldots e^{-j(M-1)\pi\sin\theta}]^T. \quad (2)$$

where T is the transpose and $\theta$ the incident angle. The received signal $r_m(t)$ at the m-th antenna AntM can be written as:

$$r_m(t) = \sum_{n=1}^{N}\sum_{l=1}^{L} \{s_n(t-\tau_{l,n})\alpha_{l,n}(t)e^{j\phi_{l,n}(t)}e^{-j(m-1)\pi\sin\theta_{l,n}(t)}\} + n_m(t) \quad (3)$$

where $\tau_{l,n}$, $\alpha_{l,n}(t)$, $\phi_{l,n}(t)$, and $\theta_{l,n}(t)$ are respectively the multi-path delay, amplitude, phase and incident angle of the l-th path from user n, and $n_m(t)$ is the thermal noise with two-sided power spectral density $N_0/2$. The lower case l=1, . . . , L, m=1, . . . , M, and n=1, . . . , N denote the indices for finger (or path), antenna, and mobile user, respectively.

The output of each antenna Ant1 . . . AntM in FIG. 2 is individually frequency down-converted by a local mixer 30-1 . . . 30-M and 31-1 . . . 31-M. The local mixers 30-1 to 30-M and 31-1 to 31-M are calibrated so that the phase distortions from the mixers are equal. An independent base band thermal noise, which is a Gaussian with mean zero and variance $N_0/2$, is added to the I and Q components at each antenna output. The base band filters H(f) specified in IS-95 or a filter of Dirac delta impulse is used. BER difference due to employing the two different base band filters is insignificant. The output signals of the base band filters 32-1 to 32-M are sampled every chip interval $T_c$ and denoted by $x_{l,m}(i)$ where i denotes the chip index. The desired user is chosen to be n=1, and user index is dropped for the brevity of notation. The multi-path delay $\delta_l$ is chosen to be a random integer between 1 and 10 (implying $T_c$ and $10T_c$, respectively). This may represent a practical multi-path delay when $T_c$ is 1/1.2288 M=0.813 µs and symbol rate is 19.2 ksps. The received samples are complex PN despread with $a_n(i-\delta_l)=a_n{}^I(i-\delta_l)+ja_n{}^Q(i-\delta_l)$ through dispreading blocks 37 and 39 where a PN code acquisition device provides information of multi-path delay $\delta_l$.

Figure 3:
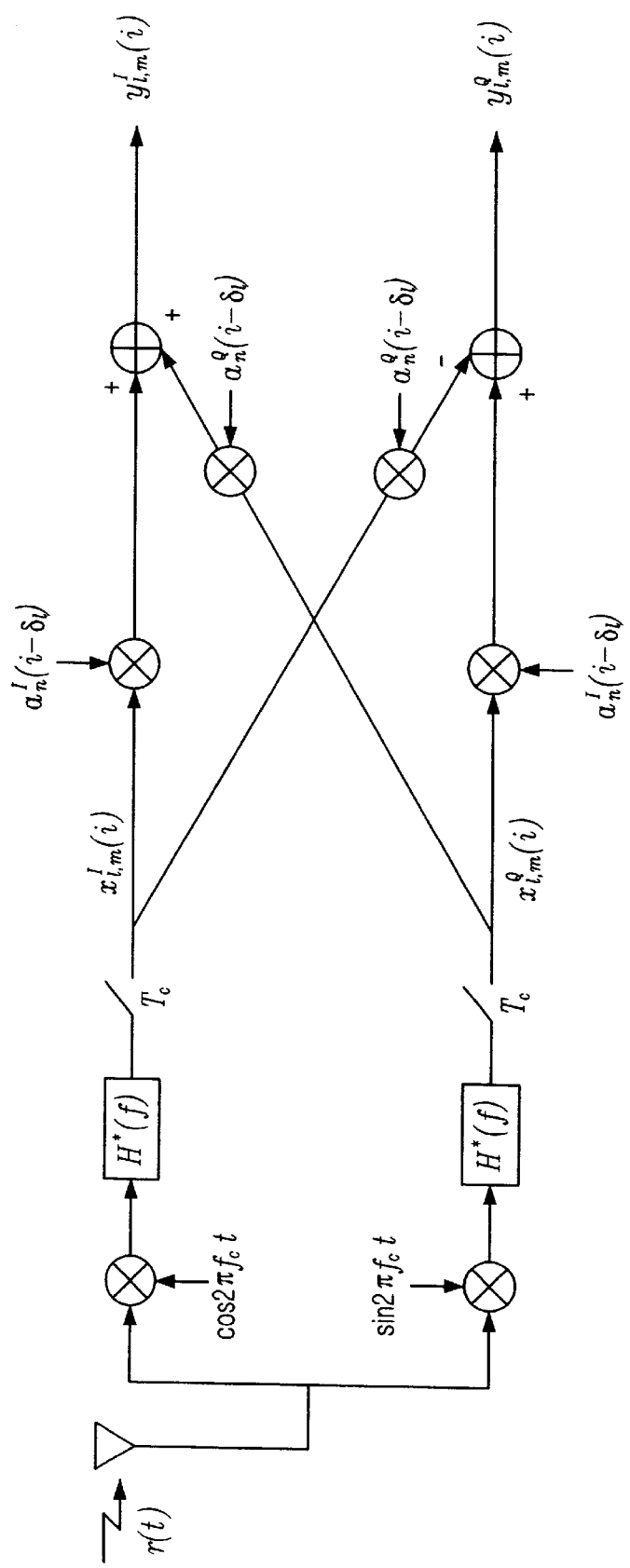
FIG. 3 is a schematic diagram for demonstrating a complex PN-despreading for the reverse traffic channel in the cdma2000 radio configuration 3.

FIG. 3 shows the details of complex PN de-spreading. The output of PN de-spreading is denoted by $y_{lm}(i)=y_{lm}{}^I(i)+jy_{lm}{}^Q(i)$. The smart antenna processor 38 for finger l in FIG. 2 takes pre-PN processing vectors $x_l(i)=(x_{l,m=1}(i), \ldots, x_{l,m=M}(i))^T$ and post-PN processing vectors $y_l(i)=(y_{l,m=1}(i), \ldots, y_{l,m=M}(i))^T$, i=(k-1)G, ..., kG for the k-th snapshot, where G is the number of PN chips per symbol and called the processing gain (equal to 64). Then, the smart antenna processor 38 in FIG. 2 generates a weight vector $w_l(k)=(w_{l,m=1}(k), \ldots, w_{l,m=M}(k))^T$ for finger l. The weight vector $w_l(k)$ is applied after PN despreading instead at the front of the receiver for channel estimation and data symbol demodulation. A Pilot-aided channel estimation in each Pilot channel estimation block 42 or 44 at the m-th antenna AntM in FIG. 2 can be written as:

$$\hat{\alpha}_{l,m}(i)e^{-j\hat{\phi}_{l,m}(i)} = \frac{1}{\sqrt{E_c A_0 N_p}} \sum_{j=i-N_p+1}^{i} y_{l,m}(j)w_{l,m}^*(j), \quad (4)$$

$$m = 1, \ldots, M$$

for finger l where * denotes the conjugate operation and $N_p$ is the number of chips in the estimation window. For traffic symbol demodulation, the weighted PN despread signal $y_{l,m}(i)w_{l,m}^*(k)$ outputted from multipliers 40 and 41 is multiplied at multipliers 45 and 46 by the conjugates of Walsh code $b_l^*(i)=b^*(i-\delta_l)$ generated by a Walsh code generator 43 and channel estimation $\hat{\alpha}_{l,m}(i)e^{-j\hat{\phi}_{l,m}(i)}$, and then accumulated for a symbol interval at accumulators 47 and 48. The output from each accumulator is denoted by $u_{l,m}(k)$ and written as:

$$u_{l,m}(k) = \sum_{i=(k-1)G}^{kG} y_{l,m}(i)w_{l,m}^*(i)b_l^*(i)\hat{\alpha}_{l,m}(i)e^{-j\hat{\phi}_{l,m}(i)}. \quad (5)$$

The spatial and temporal RAKE combining is performed over m and l, respectively, at accumulators 49 and 150 and written as:

$$u(k) = \sum_{l=1}^{L}\sum_{m=1}^{M} u_{l,m}(k). \quad (6)$$

The soft decision variable u(k) can be fed into either a Viterbi soft decision decoder 151 or a hard decision block 152. This invention employs the hard decision 152, and analyzes and simulates code symbol (bit) error probability.

Smart Antenna Algorithms

Figure 4:
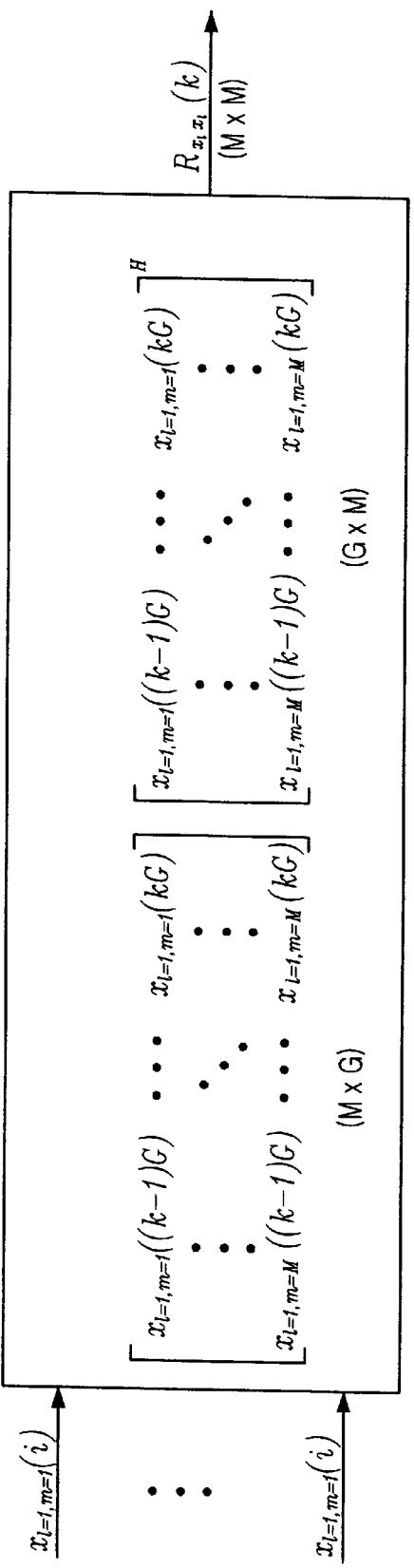
FIG. 4 is a schematic diagram for showing an auto-correlation matrix estimator $R_{xx}(k)$ of pre-PN dspreading array sample vector x(k)
Figure 5:
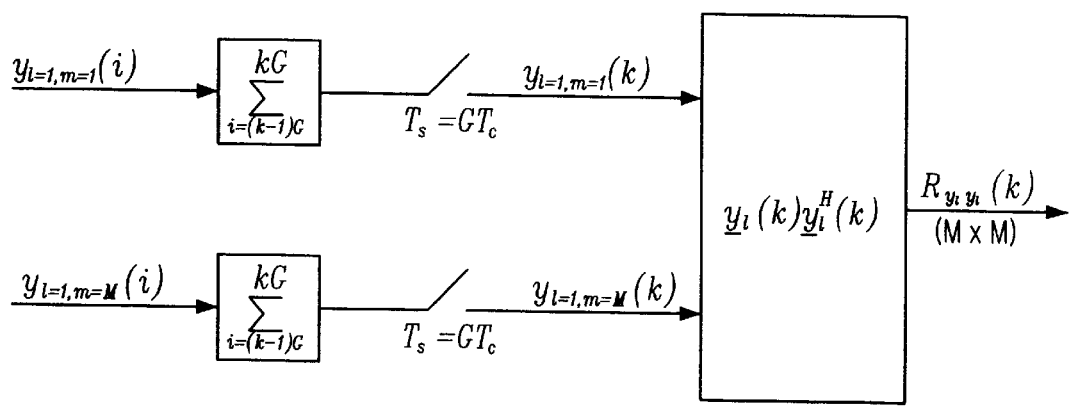
FIG. 5 is a schematic diagram for describing an auto-correlation matrix estimator $R_{yy}(k)$ of post-PN despreading array sample vector y(k)

The smart antenna array processor 38 in FIG. 2 may require auto-correlation matrix $R_{xx}(k)$ and $R_{yy}(k)$ of the pre-PN processing data $x_l(i)$ and post-PN processing data $y_l(i)$. FIGS. 4 and 5 show how to adaptively estimate auto-correlation matrix $R_{xx}(k)$ and $R_{yy}(k)$, respectively for finger l. The matrix operation in FIG. 4 is equivalent to:

$$R_{x_l x_l}(k) = \sum_{i=(k-1)G}^{kG} x_l(i)x_l^H(i) \quad (7)$$

where H denotes the conjugate transpose. In FIG. 5, the PN spread samples $y_{l,m}(i)$ are summed over a symbol interval to estimate $R_{yy}(k)$. The traffic channel components are suppressed and the pilot channel information is passed after the summation due to the orthogonal Walsh codes. The auto-correlation matrix $R_{yy}(k)$ can be estimated as:

$$R_{yy}(k) = E\left\{\begin{pmatrix} y_{l,m=1}(k) \\ \vdots \\ y_{l,m=K}(k) \end{pmatrix}\begin{pmatrix} y_{l,m=1}(k) \\ \vdots \\ y_{l,m=K}(k) \end{pmatrix}^H\right\}. \quad (8)$$

Four smart antenna algorithms are considered in this section. Two of them are newly invented ones. One of them is recently invented by the inventors in the article of Yoo S. Song et al., "Analysis of a Simple Smart Antenna for Code Division Multiple Access Wireless Communications," submitted to the *IEEE Journal on Selected Area in Communications*, June 1999. One of them is the smart algorithm modified by the inventors, based on the maximum SINR output criteria in the above article of Ayman F. Naguib.

1). Smart Antenna Based on Maximum Output Power without Lagrange Multiplier

Figure 6:
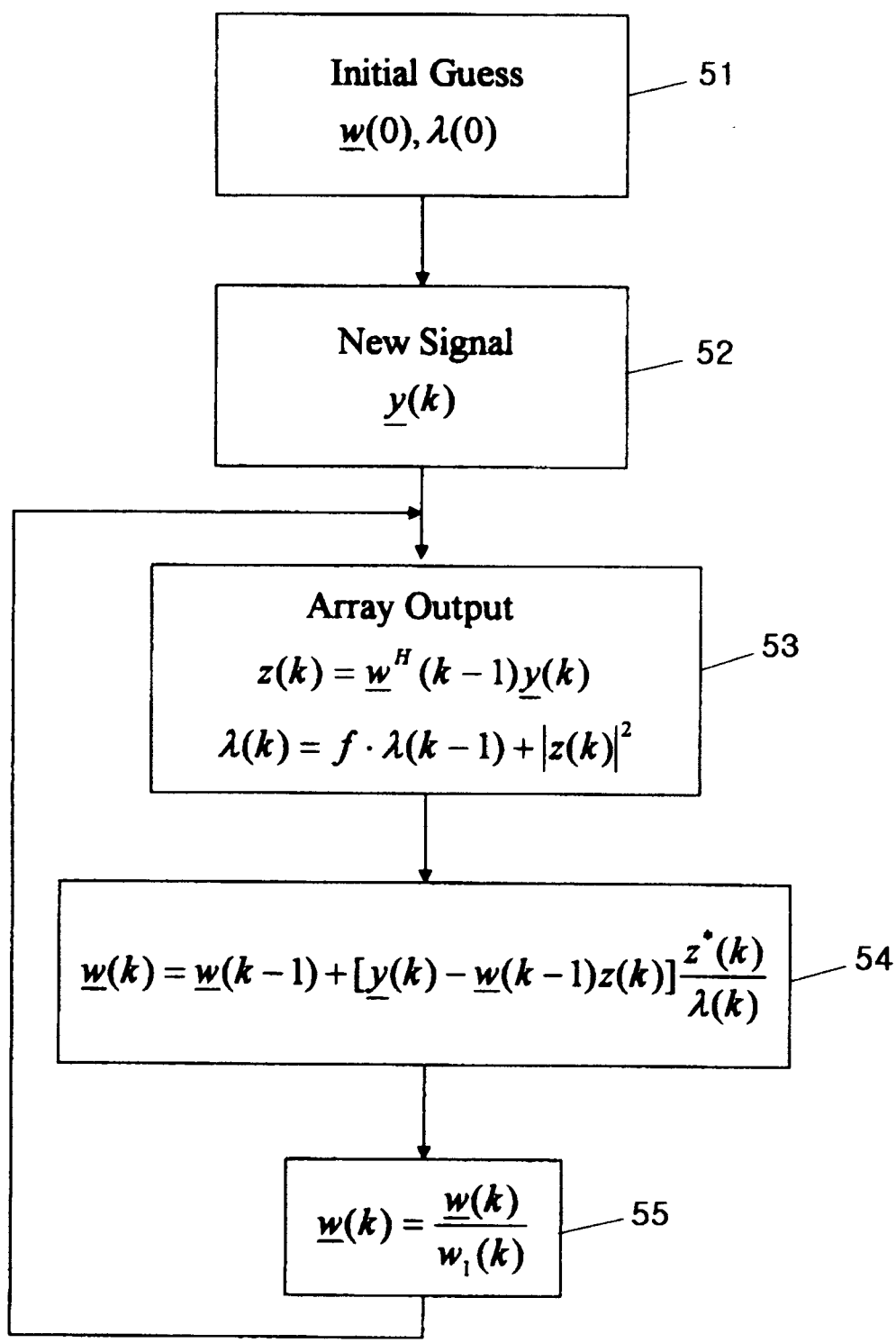
FIG. 6 is a flow chart for the smart antenna based on the maximum output power criteria without Lagrange multiplier in accordance with the present invention.

FIG. 6 shows the flow chart of the smart antenna invented by the inventors in the above article by Yoo S. Song et al., which minimizes the mean square error (MMSE) by using projection approximation subspace tracking with deflation (PASTd) described in an article by B. Yang, "An Extension of the PASTd Algorithm to Both Rank and Subspace Tracking," *IEEE Signal Processing Letter*, vol. 2, no. 9, pp. 179–182, September 1995, instead of maximizing the SINR. The Lagrange multiplier is not employed. At steps 51 and 52, the optimal array weight vector w(k) approaches the principal eigenvector of the autocorrelation matrix of y(k) when the SINR is sufficient. The cost function may be written as:

$$J(w(k))=E\|y(k)-w(k)w^H(k)y(k)\|^2=tr(R_{yy}(k))-2tr(w^H(k)R_{yy}(k)w(k))+tr(w^H(k)R_{yy}(k)w(k)w^H(k)w(k)) \quad (9)$$

for a high SINR where tr is the trace operation. Finger index l is dropped for the brevity of notation. At steps 54 and 55, the updated weighting vector w(k) at the snapshot index k can be written as:

$$\underline{w}(k) = \underline{w}(k-1) - \frac{1}{2}\frac{1}{\lambda(k)}\nabla(k) \quad (10)$$

$$= \underline{w}(k-1) + [\underline{y}(k) - \underline{w}(k-1)z(k)]\frac{z^*(k)}{\lambda(k)}$$

$$\underline{w}(k) = \frac{\underline{w}(k)}{w_1(k)} \quad (11)$$

where $\nabla(k)$ is the M×1 gradient vector of the cost function in Eq. (9), * is the conjugate operation, $\lambda(k)$ is the eigenvalue of the auto-covariance matrix $R_{yy}(k)$ $w_1(k)$ is the first element of w(k), and at step 53, z(k) is the array output as:

$$z(k)=w^H(k-1)y(k). \quad (12)$$

The initial weight vector w(0) is set to $(1, \ldots, 1)^T$. The eigenvalue $\lambda(k)$ is updated as:

$$\lambda(k)=f\lambda(k-1)+|z(k)|^2 \qquad (13)$$

where forgetting factor f is set to 0.9 and initial eigenvalue $\lambda(0)$ to M. Thus, it takes only 4M computation cycles per snapshot by using Eqs. (10)–(13), which is significantly smaller than the existing algorithms. Note that the operation $w(k)w^H(k)$ over y(k) in Eq. (9) becomes an identical mapping from y(k) to y(k) although it is not an identity matrix, and the mean square error $E[\|y(k)-w(k)w^H(k)y(k)\|^2]$ becomes zero when the weight vector is optimum, i.e., if the weight vector w(k) is proportional to the arrival channel vector a(k). Note also that the first term in Eq. (9) has nothing to do with optimization, and the sum of the second and third terms in Eq. (9) becomes $-w^H(k)R_{yy}(k)w(k)=-|z(k)|^2$, which is the negative of the array output power $|z(k)|^2$ when $w^H(k)w(k)=1$. In other words, the power of the array output z(k) is maximized if the weight vector w(k) minimizes the cost function in Eq. (9). This algorithm may be effective in a 2G or 3G CDMA system because the spreading gain usually suffices to allow the desired user signal to dominate in contributing the array output power and the beam pattern of the weight vector to track the desired user signal's direction. A weak point of this algorithm is the optimum weight vector can track an undesired user signal direction if the power of the undesired user signal after PN despreading is strong when the number of other users is small. The research in the article of D. Shim et al. also employs a kind of maximum array output power criteria and shows performance similar to results in this invention. However, the maximum output power criteria in the article of D. shim employs a Lagrange multiplier method and introduces a little bit higher computational loads of 5.5M rather than 4M.

2). Smart Antenna Based on Maximum SINR Output with Eigenvector Finding

Figure 7:
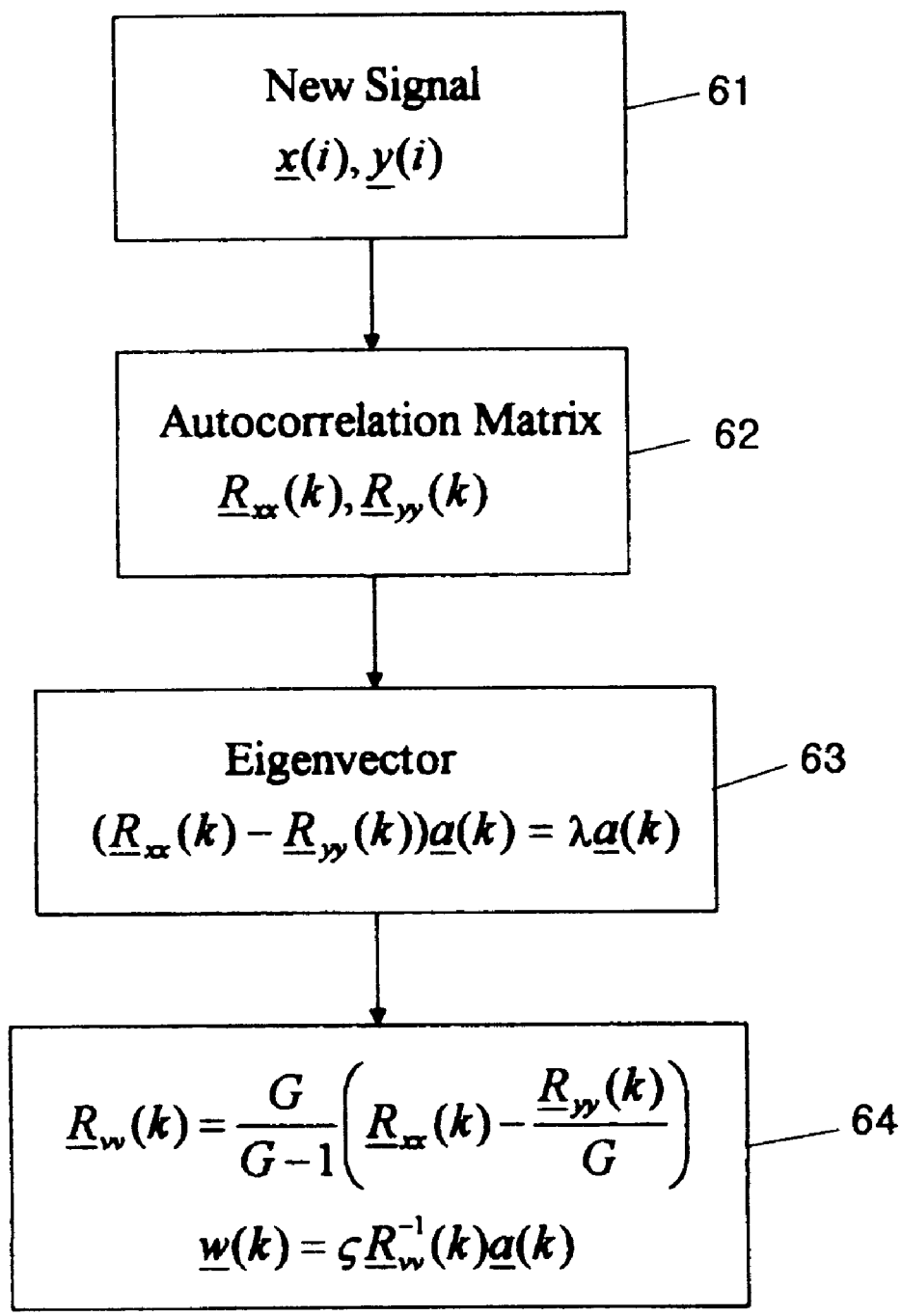
FIG. 7 is a flow chart for the smart antenna modified in accordance with the present invention, based on the maximum SINR criteria with eigenvector finding.

FIG. 7 shows the flow chart of the smart algorithm modified in accordance with the present invention, based on the maximum SINR output criteria in the article of Ayman F. Naguib et al. At step 61, the post-PN correlation signal vector y for a finger of a user can be written as:

$$y(k)=s(k)+i(k)+n(k)=s(k)+v(k) \qquad (14)$$

at snapshot k where s(k) is the M×1 desired user signal vector through fading channel, i(k) is the M×1 PN-spread interference signal vector, n(k) is the M×1 thermal noise vector, and v(k)=i(k)+n(k) is the interference plus noise vector. At step 62, the SINR at the output of the smart antenna beam-former can be written as:

$$SINR(\underline{w}(k)) = \frac{\underline{w}^H(k)R_{ss}(k)\underline{w}(k)}{\underline{w}^H(k)R_{vv}(k)\underline{w}(k)}. \qquad (15)$$

At step 64, the optimum weight vector can be written as:

$$w(k)=\zeta R_{vv}^{-1}(k)a(k) \qquad (16)$$

$$\underline{w}(k) = \frac{w(k)}{w_1(k)} \qquad (17)$$

where $$R_{vv}(k) = \frac{G}{G-1}\left(R_{xx}(k) - \frac{1}{G}R_{yy}(k)\right), \qquad (18)$$

G=PN spread processing gain, $R_{xx}(k)$=M×M autocorrelation matrix of M×1 x(i), pre-PN de-spreading array sample vector, $R_{yy}(k)$=M×M autocorrelation matrix of M×1 y(k), post-PN de-spreading array sample vector, and v(t) the undesired signal. The constant $\zeta$ in Eq. (16) does not affect the beam-former SINR output. In the article of Ayman F. Naguib et al., the channel vector a(k) is estimated as the principal eigenvector of the generalized eigenvalue problem, i.e.:

$$R_{yy}(k)a(k)=\eta R_{xx}(k)a(k). \qquad (19)$$

At step 63, in this invention, the channel vector a(k) is simply estimated as the eigenvector with maximum eigenvalue of matrix $R_{yy}(k)-R_{xx}(k)$ since the channel vector a(k) satisfies the following Eq.:

$$(R_{yy}(k)-R_{xx}(k))a(k)=\lambda a(k). \qquad (20)$$

It can be easily shown that the weighting vector obtained by using Eq. (20) also maximizes the output SINR. The computational load of the smart antenna with Eq. (20) is in the order of $M^2$ per snapshot, while the smart antenna algorithm in the article of Ayman F. Naguib et al. using Eq. (19) takes more than $M^2$ order per snapshot. Recursive estimation of the channel vector is employed in the article of Ayman F. Naguib et al. for each finger of each user with the power method recursion described in an article by G. H. Golub et al., Matrix Computations, Baltimore and London, Johns Hopkins University Press, second edition, 1989.

The time-update Eqs. for $\hat{R}_{xx}(k)$, $\hat{R}_{yy}(k)$, $\hat{R}_{uu}(k)$ are written as:

$$\hat{R}_{xx}(k)=f\hat{R}_{xx}(k-1)+x(k)x^H(k) \qquad (21)$$

$$\hat{R}_{yy}(k)=f\hat{R}_{yy}(k-1)+y(k)y^H(k) \qquad (22)$$

$$\hat{R}_{vv}(k) = f\hat{R}_{vv}(k-1) + \frac{G}{G-1}x(k)x^H(k) - \frac{1}{G-1}\underline{y}(k)\underline{y}^H(k) \qquad (23)$$

where f is a forgetting factor.

3). Smart Antenna Based on Maximum SINR Output without Eigenvector Finding

Figure 8:
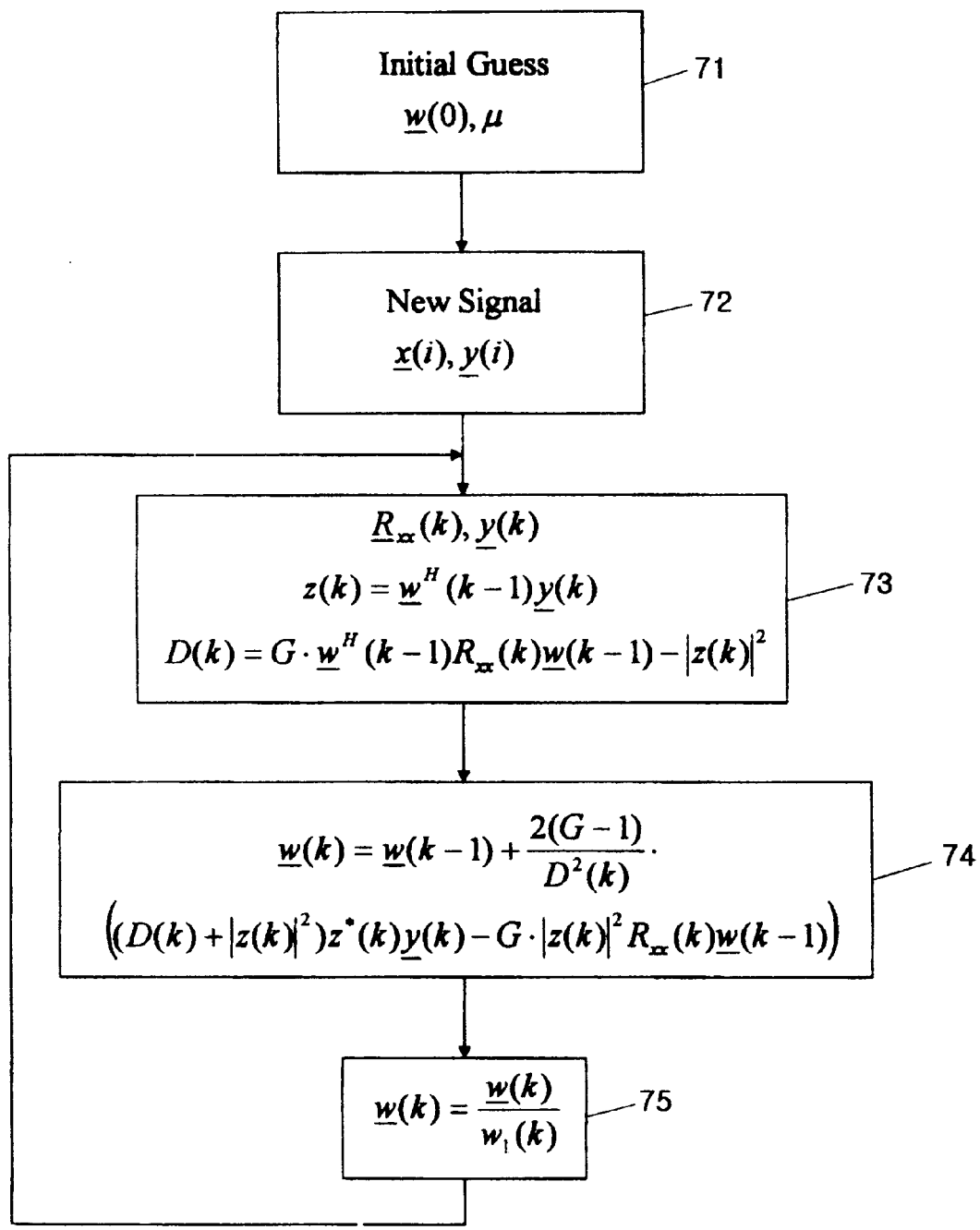
FIG. 8 is a flow chart for the inventive smart antenna based on the maximum SINR criteria without eigenvector finding in accordance with another embodiment of the present invention.

FIG. 8 shows a smart algorithm simplified in accordance with the present invention, based on the maximum SINR criteria in the article of Ayman F. Naguib et al. Smart antenna weight vector is applied after post-PN processing as in the article of Ayman F. Naguib et al. to exploit the advantage of the DS-CDMA system over other time division multiple access (TDMA) or frequency division multiple access (FDMA) systems. At step 73, the autocorrelation matrix $R_{xx}(k)$ of pre-PN de-spreading array sample vector x(k) can be usually obtained with the samples in the current snapshot interval. The optimum weight vector, which maximizes the SINR, can be recursively updated by taking gradient vector $\nabla(k)$ of the SINR with respect to w(k). And at steps 74 and 75, the new optimum weight vector can be obtained as:

$$w(k) = w(k-1) + \quad (24)$$
$$\frac{2(G-1)\mu}{D^2(k)}[\{D(k)+|z(k)|^2\}z^*(k)y(k) - G|z(k)|^2 R_{xx}(k)w(k-1)]$$

$$w(k) = \frac{w(k)}{w_1(k)} \quad (25)$$

where $\mu$ is the convergence parameter, G is the PN processing gain equal to the number of chips per symbol, z(k) is the array output, and:

$$D(k) = Gw^H(k-1)R_{xx}(k)w(k-1) - |z(k)|^2. \quad (26)$$

Eqs. (12), (24)–(26) require neither any computations of eigenvalues or eigenvectors nor the inverse of any matrices, but only require multiplication between scalars and vectors and products between a matrix and vectors. Thus, the overall computation load to get the array output z(k) in the invented algorithm is $2M^2+4M$ per snapshot, which is significantly smaller than those of the existing algorithms in the article of Ayman F. Naguib et al.

Figure 9:
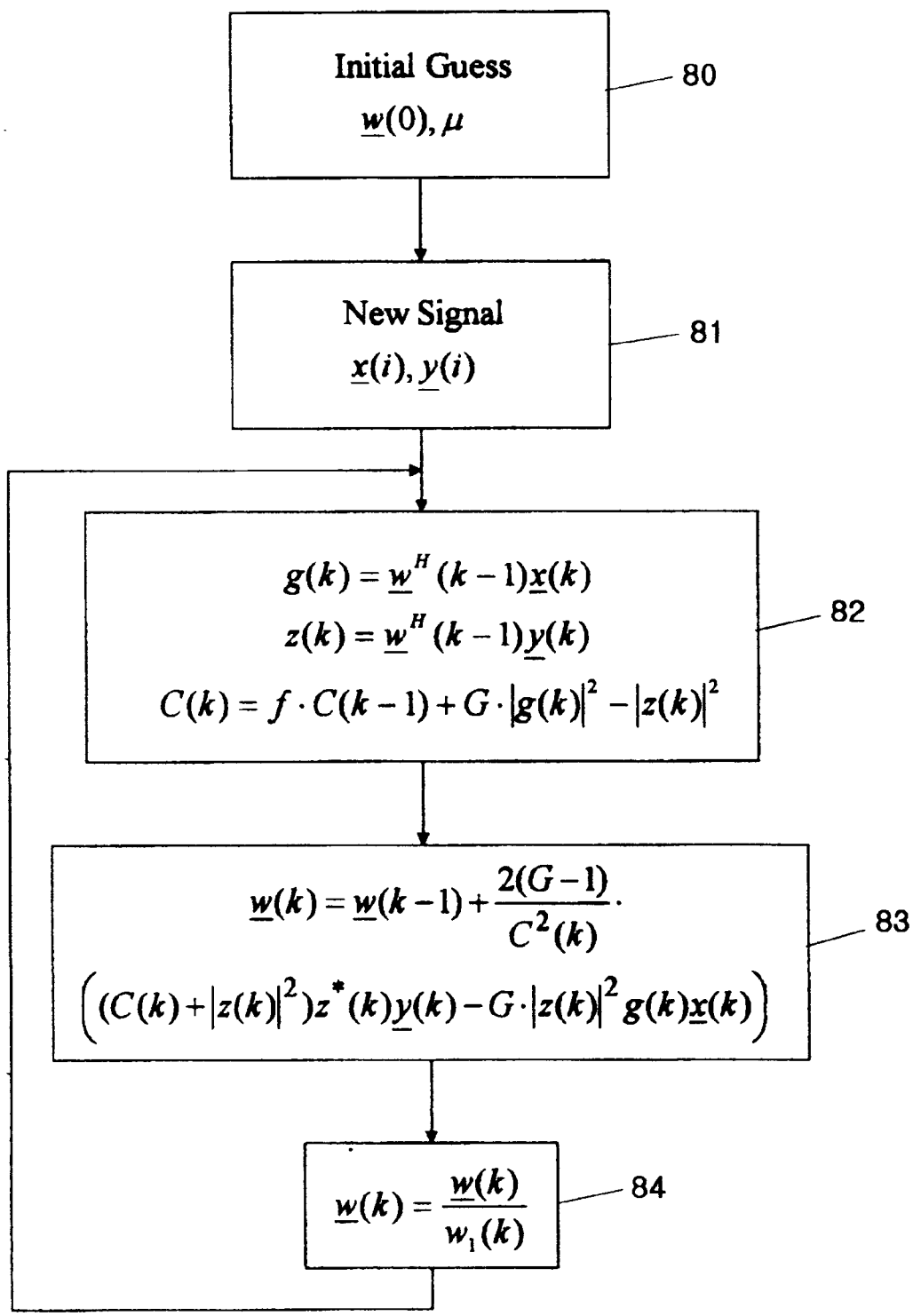
FIG. 9 is a flow chart for the more simplified smart antenna based on the maximum SINR criteria without eigenvector finding in accordance with another embodiment of the present invention.

4). More Simplified Smart Antenna Based on Maximum SINR Output without Eigenvector Finding FIG. 9 shows further simplification of Eqs. (24)–(26) by taking an approximation of $R_{xx}(k)$ as:

$$R_{xx}(k) \approx x(k)x^H(k) \quad (27)$$

which, at step 82, is usually valid, and by defining a scalar g(k) as:

$$g(k) = w^H(k-1)x(k). \quad (28)$$

Then, at steps 82 and 83, Eqs. (24) and (26) become:

$$w(k) = w(k-1) + \quad (29)$$
$$\frac{2(G-1)\mu}{C^2(k)}[\{C(k)+|z(k)|^2\}z^*(k)y(k) - G|z(k)|^2 g(k)w(k)]$$

$$C(k) = fC(k-1) + G|g(k)|^2 - |z(k)|^2 \quad (30)$$

where f is a forgetting factor. Eqs. (12), (27)–(30) do not require any computations of eigenvalues, eigenvectors, the inverse of any matrices nor any products between matrix and vectors, but only require multiplication between scalars and vectors. Thus, the overall computation load to get the array output z(k) with the simplified algorithm in Eqs. (12), (29), and (30) is only 4M per snapshot, which is much smaller than those of the existing algorithms.

Analysis

The phase of the multi-path fading does not affect the smart antenna weight vector updating process when the fading rate is slow compared to the snapshot (symbol) rate, which is true in most practical applications. Only the magnitude of the multipath fading influences on the weight update processing. This fact can be demonstrated in below. The steady state weight vector at the snapshot k−1 is proportional to the channel vector a(k) and can be written as:

$$w(k-1) = \begin{pmatrix} 1 \\ e^{-j\pi\sin\theta(k-1)} \\ \vdots \\ e^{-j(M-1)\pi\sin\theta(k-1)} \end{pmatrix}. \quad (31)$$

Then, the post-PN despread signal y(k) from the pilot channel in FIG. 5 can be written as:

$$y(k) = \alpha(k)e^{j\phi(k)} \begin{pmatrix} 1 \\ e^{-j\pi\sin\theta(k)} \\ \vdots \\ e^{-j(M-1)\pi\sin\theta(k)} \end{pmatrix}. \quad (32)$$

The antenna array output z(k) can be written as:

$$z(k) = w^H(k-1)y(k) = \alpha(k)e^{j\phi(k)} \sum_{m=1}^{M} e^{-j(m-1)\pi\sin(\theta(k)-\theta(k-1))}. \quad (33)$$

For example, if the maximum output power criteria is taken for the smart antenna processor, then the updated weight vector in Eq. (10) can be written as $$w(k) = w(k-1) + [y(k) - w(k-1)z(k)]\frac{z^*(k)}{\lambda(k)} \quad (34)$$

$$= w(k-1)\left(1 - \frac{|z(k)|^2}{\lambda(k)}\right) + y(k)\frac{z^*(k)}{\lambda(k)}$$

$$= c(k)w(k-1) + \frac{\alpha^2(k)}{\lambda(k)} \begin{pmatrix} 1\sum_{m=1}^{M} e^{j(m-1)\pi\sin(\theta(k)-\theta(k-1))} \\ e^{-j\pi\sin\theta(k)}\sum_{m=1}^{M} e^{j(m-1)\pi\sin(\theta(k)-\theta(k-1))} \\ \vdots \\ e^{-j(M-1)\pi\sin\theta(k)}\sum_{m=1}^{M} e^{j(m-1)\pi\sin(\theta(k)-\theta(k-1))} \end{pmatrix}$$

$c(k) = \{1 - |z(k)|^2/\lambda(k)\}$ where and the right side of Eq. (34) is independent of fading phase $\phi(k)$ due to the conjugate multiplication. This fact may be useful for simulation. Also, the phase of the overall undesired signals in a snapshot interval may be modeled as a uniform random variable, although the incident angle $\theta_n(k)$ from the individual user n varies continuously. This fact may be useful to reduce simulation time.

Let $G_{avg}(\theta_1)$ denote the suppression gain against interference obtained by a smart antenna when the incident angle from the desired user is $\theta_1$. Then $G_{avg}(\theta_1)$ is less than or equal to 1, and the suppressed interference output power becomes $G_{avg}(\theta_1)I$ with the smart antenna when interference power without smart antenna is I=(N−1)P. FIG. 18 lists the three averaged angle gain with respect to $\theta_1$; the angle gain for the real component $G_{avg,Re}$, the angle gain for the imaginary component $G_{avg, Im}$, and the sum of the real and the imaginary component angle gain $G_{avg}$. If the modulation is binary phase shift keying (BPSK) instead of quadrature phase shift keying (QPSK), then the real part angle gain $G_{avg,Re}$ should be employed because the bit decision is based on the real component. If the modulation is QPSK as used in the cdma2000, then the sum of the real and the imaginary component angle gain $G_{avg}$ should be used.

Similarly, it is shown in the article of Yoo S. Song et al. that effective output thermal noise power is reduced by M when a smart antenna array of M antennas is employed. Let $\rho_c$ denote the average output SINR of the l-th multi-path. Then $\rho_c$ can be written as:

$$\rho_c = \overline{\alpha_l^2} \frac{E_b}{L\left(\frac{N_0}{M} + G_{avg}(\theta_1)I_0\right)} \quad (35)$$

where $\overline{\alpha_l^2}$ is the average power of the l-th multipath fading.

If a conventional array of multiple antennas is employed with no weight processing, then the SINR improvement can be achieved over only thermal noise. There would be no spatial suppression gain against interference. This can be explained as follows: Suppose there is no thermal noise. Then every antenna receives the identical interference signal. The conventional array antenna increases both signal and interference power by factor M. Thus, employing an array antenna does not improve the signal-to-interference output power ratio. Now, suppose there is no interference and only independent thermal noise is added to each antenna. Then signal output power is increased by factor M. Thus, $\rho_c$ can be written as $$\rho_c = \overline{\alpha_l^2} \frac{E_b}{L\left(\frac{N_0}{M} + I_0\right)} \quad (36)$$

for the conventional array antenna with no smart antenna processing where $I_0 = (N-1)P/\{W=1/T_c\}$.

Equal gain combining (EGC) receiver is employed after the smart antenna and independent noise is added in each diversity channel. The SINR at the output of the combiner is the sum of channel SINRs. The universal BER formula under L independent Rayleigh fading paths in an article by J. S. Lee et al., CDMA Systems Engineering Handbook, Artech House Publishers, pp. 959, 1998, can be employed for the CDMA with smart antenna processor and can be written as:

$$P_b(E) = p^L \sum_{l=0}^{L-1} \binom{L+l-1}{l}(1-p)^l \quad (37)$$

where p is the symbol error probability under the l-th multi-path fading, and can be written as:

$$p = \frac{1}{2}\left(1 - \sqrt{\frac{\rho_c}{1+\rho_c}}\right). \quad (38)$$

Simulation and Analysis Results

For simulation, it is assumed that the other users have a single multipath, and the other multipaths in the desired user signal are treated as interference. Thus, the received signal at the m-th antenna in Eq. (3) is approximated as:

$$r_m(t) = s_1(t)\alpha_1(t)e^{j\phi_1(t)}e^{-j(m-1)\pi\sin\theta_1(t)} + \quad (39)$$
$$\sum_{n=2}^{N} s_n(t-\tau_n)\alpha_n(t)e^{j\phi_n(t)}e^{-j(m-1)\pi\sin\theta_n(t)} + n_m(t).$$

where the first term in Eq. (39) represents the desired finger signal from the desired user (n=1, l=1). For fast simulation, the interference, i.e., the second term in Eq. (39), is simplified as:

$$\sum_{n=2}^{N} s_n(t-\tau_n)\alpha_n(t)e^{j\phi_n(t)}e^{-j(m-1)\pi\sin\theta_n(t)} = I(t)e^{-j\pi(m-1)\sin\theta(t)} \quad (40)$$

where I(t) is a white Gaussian random process with mean zero and variance equal to (N−1), and θ(t) is a uniformly distributed random process from −π/2 to π/2. The unit time of t is set to a PN chip interval.

Figure 10A:
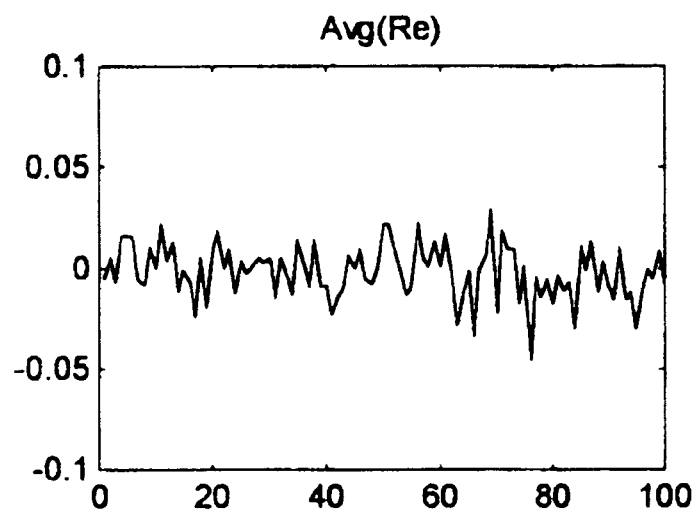
FIG. 10A shows a graph illustrating the mean and variance of the real and the imaginary components in the $2^{nd}$ element of antenna array vector when the practical interference model is used for N=10 users.
Figure 10B:
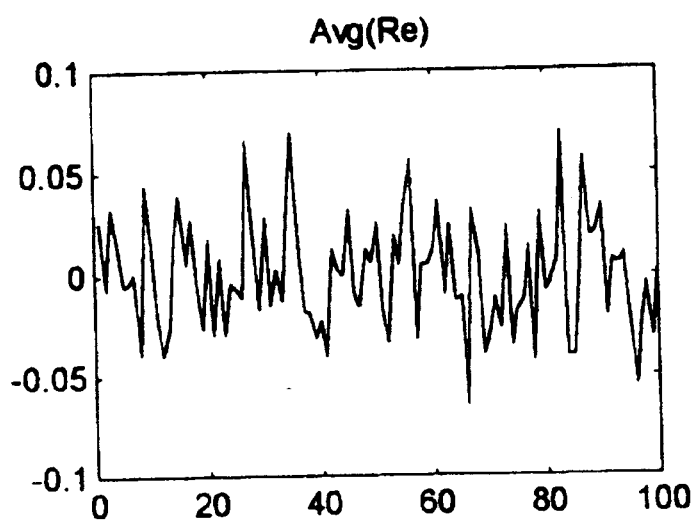
FIG. 10B shows a graph demonstrating the mean and variance of the real and the imaginary components in the $2^{nd}$ element of antenna array vector when the practical interference model is used for N=30 users.
Figure 10C:
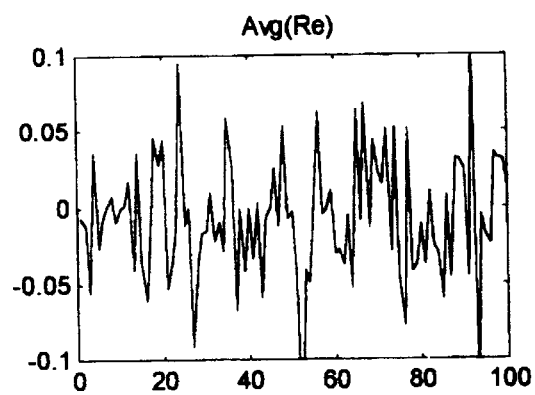
FIG. 10C shows a graph of the mean and variance of the real and the imaginary components in the $2^{nd}$ element of antenna array vector when the practical interference model is used for N=70 users.
Figure 10D:
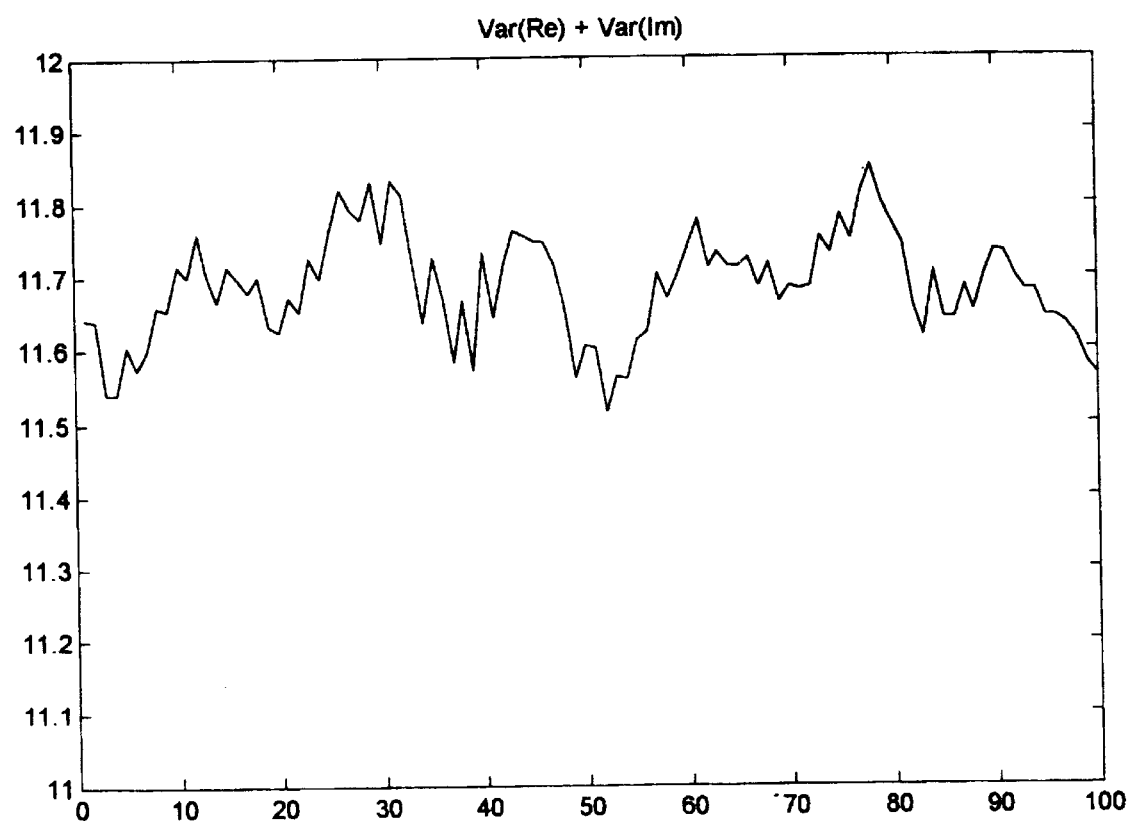
FIG. 10D shows a graph of the sum of the real part and the imaginary component variance in the $2^{nd}$ element of antenna array vector when the practical interference model is used for N=70 users.
Figure 10E:
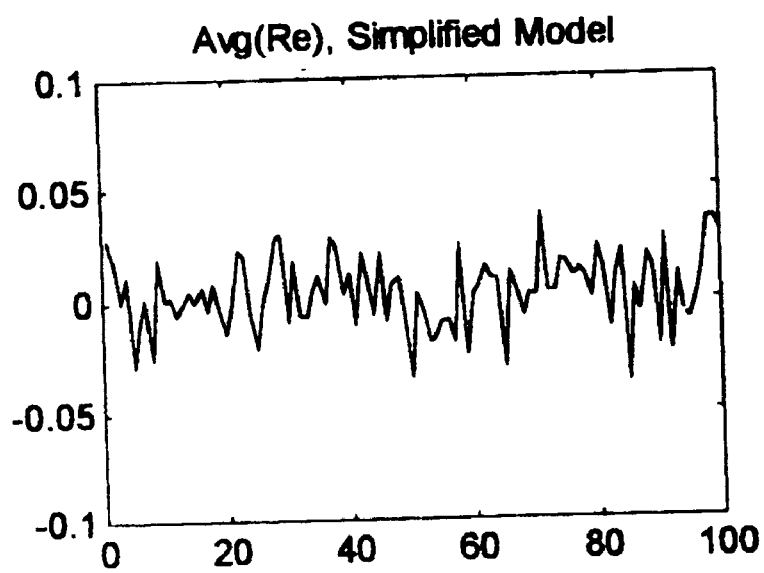
FIG. 10E shows a graph of the mean and variance of the real and the imaginary components in the $2^{nd}$ element of antenna array vector when the simplified interference model is used for N=10 users.
Figure 10F:
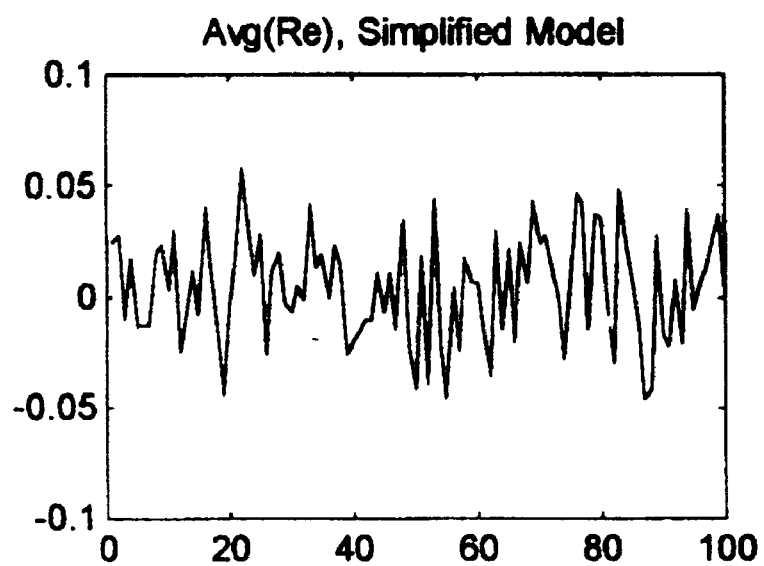
FIG. 10F shows a graph of the mean and variance of the real and the imaginary components in the $2^{nd}$ element of antenna array vector when the simplified interference model is used for N=30 users.
Figure 10G:
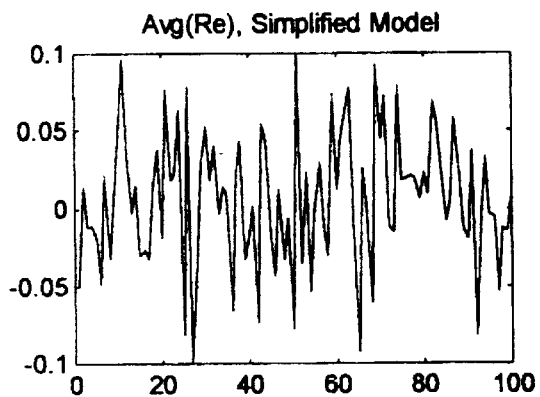
FIG. 10G shows a graph of the mean and variance of the real and the imaginary components in the $2^{nd}$ element of antenna array vector when the simplified interference model is used for N=70 users.

FIGS. 10A, 10B and 10C show the mean and variance of the real and imaginary components for the practical interference model at the 2-nd element of the antenna array, by using the left hand side of Eq. (40), when the number of other signals (N−1) is equal to 10, 30, and 70, respectively. Horizontal axes denote the frame index. FIG. 10D shows the sum of the real part variance and imaginary part variance for the practical model when the number of other signals is 70. FIGS. 10E, 10F, and 10G show the corresponding mean and variance of the real and imaginary components for the simplified interference model at the 2-nd element of the antenna array, by using the right hand side of Eq. (40) when the number of other signals (N−1) is equal to 10, 30, and 70, respectively.

Figure 10H:
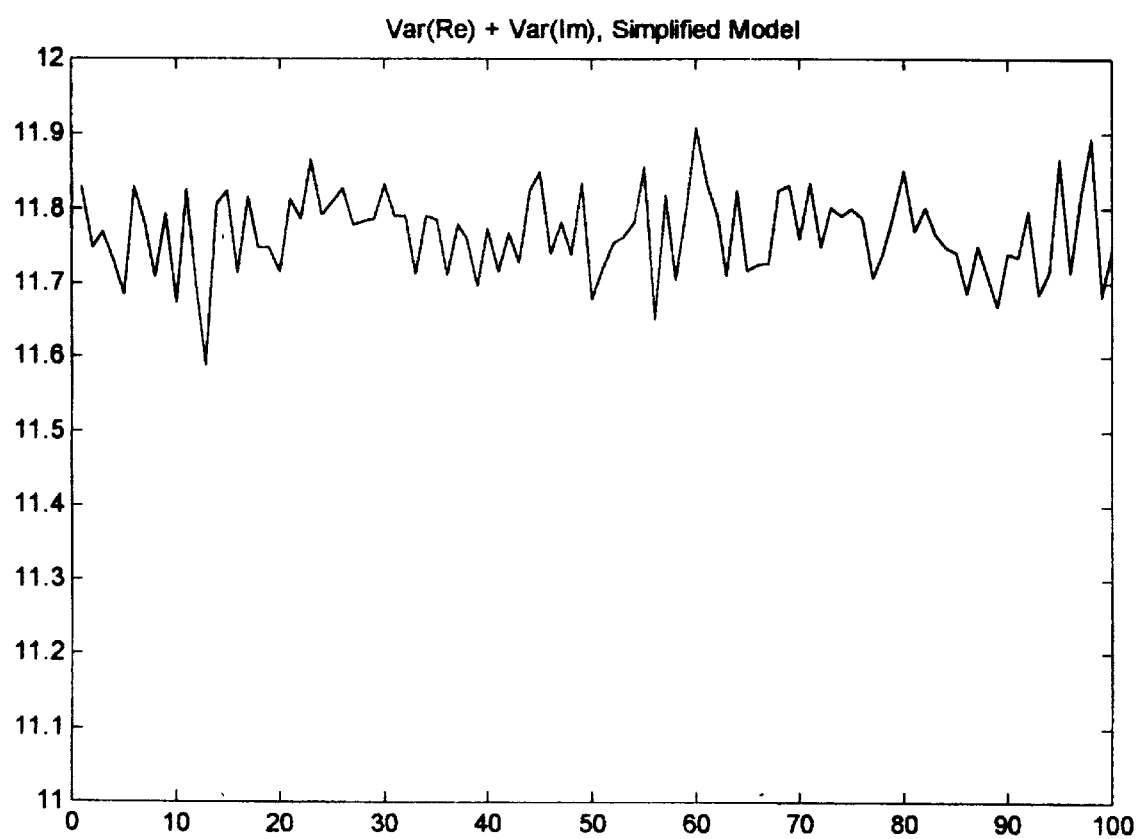
FIG. 10H shows a graph of the sum of the real part and the imaginary component variance in the $2^{nd}$ element of antenna array vector when the simplified interference model is used for N=70 users.

FIG. 10H shows the sum of the real part variance and imaginary part variance for the simplified model when the number of other signals is 70. It is observed that the samples of the practical interference model are correlated due to the users' continuous movements along the circle of a radius while the samples of the simplified interference model are uncorrelated due to the white Gaussian model. FIG. 19 lists the mean and variances of the practical and the simplified interference, and their difference. It is observed that the difference of the variance between the two models decreases as the number of other signals increases.

Figure 11:
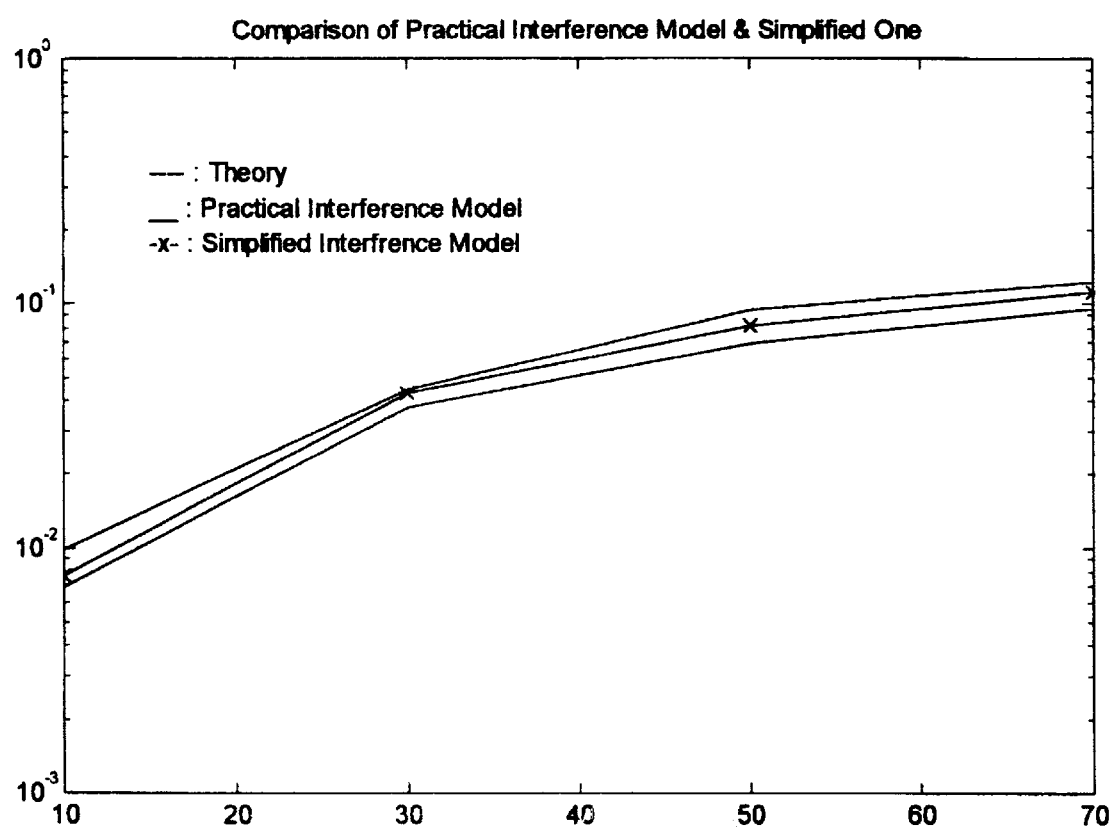
FIG. 11 shows a graph of the simulation BER results versus the number of signals N for the simplified and the practical interference model wherein theoretical smart antenna BER results are also shown when M=3 antennas, L=2 equal strength Jake fading multipaths, the mobile velocity=50 km/h, and $E_b/N_0$=20 dB and the maximum output power criteria without Lagrange multiplier was employed.

FIG. 11 shows simulation BER results versus the number of signals N for the simplified and the practical interference model. Theoretical BER results of the smart antenna are also shown for comparison when M=3 antennas and L=2 equal strength Jake fading multipaths, i.e., $\overline{\alpha_{l=1}^2} = \overline{\alpha_{l=2}^2} = 0.5$, are assumed with the mobile velocity equal to 50 km/h. The bit-energy-to-thermal-noise-density ratio ($E_b/N_0$) is chosen to be 20 dB. The maximum output power criteria without Lagrange multiplier was employed. It is observed that the BER difference between the practical and the simplified interference model is insignificant, and both are also close to the theoretical BER results.

Figure 12:
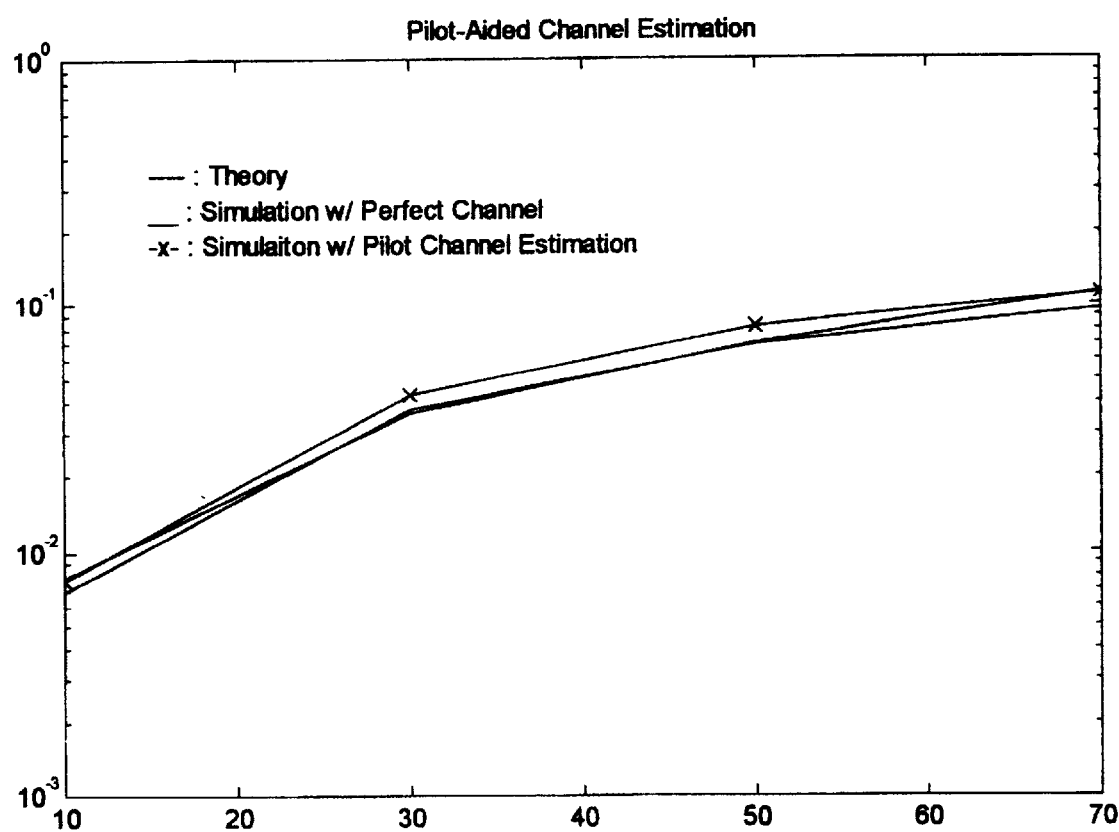
FIG. 12 shows a graph of BER degradation by employing the pilot-aided channel estimation in the cdma2000 reverse link, wherein Equal strength multi-path fading, M=3 antennas, L=2 paths, and $E_b/N_0$=20 dB are assumed.

FIG. 12 demonstrates BER degradation due to the pilot-aided channel estimation in the cdma2000 reverse link. The maximum output power criteria without Lagrange multiplier was employed. Three BER curves versus the number of users N are shown. The three curves are (a) theoretical BER results using Eqs. (35) and (37) assuming perfect channel estimation, (b) simulation BER with perfect channel information $\alpha_l(i)e^{j\phi_l(i)}$, and (c) simulation BER with pilot-aided channel estimation $\hat{\alpha}_l(i)e^{-j\phi_l(i)}$ in FIG. 1. It is observed that degradation due to the pilot channel estimation is insignificant. The smart antenna based on the maximum output power criteria in Eqs. (10)–(13) was used with M=3 antennas. The number of chips $N_p$ in the pilot channel estimation window was chosen to be 128. Signal-to-thermal noise input ratio $E_b/N_0$ is set to 20 dB when there is no smart antenna array. L=2 equal strength Jake fading multipaths, i.e., $\overline{\alpha_{l=1}^2} = \overline{\alpha_{l=2}^2} = 0.5$, are simulated assuming the mobile velocity is 50 km/h. When the number of users N is less than or equal to 30, the incident angles of the N−1 other users are assumed to change linearly. In other words, the practical interference model in the left hand side of Eq. (40) is used. When the number of users is larger than 30, the overall interference is simulated with a uniformly distributed incident angle and a Gaussian variable amplitude with mean zero and given interference power (N−1). In other words, the simplified interference model in the right hand side of Eq. (40) is used. BER difference between the continuously varying incident angle model for an individual user and a random incident angle model for the overall other users is again negligible when N>30. The incident angle of the desired user changes linearly with 0.01° per snapshot. Convergence parameter $\mu=0.0001$ was used throughout the simulation.

Figure 13A:
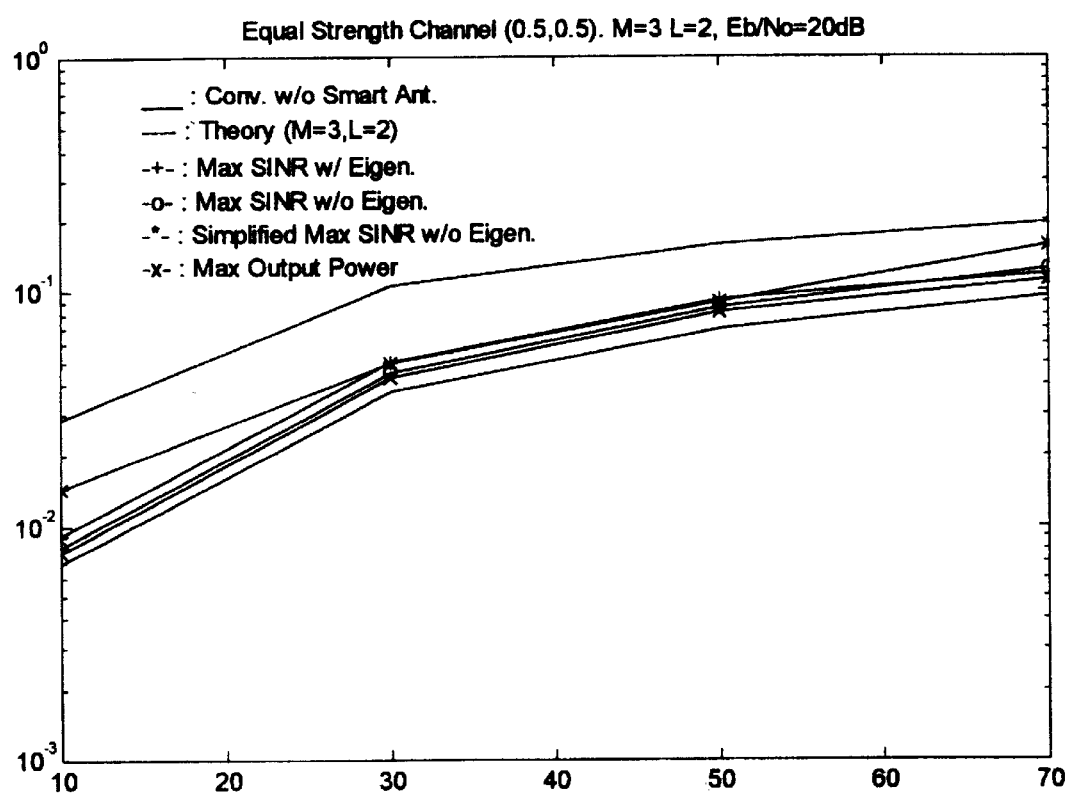
FIG. 13A shows a graph of the BER results for the smart antennas under equal strength multi-path fading wherein M=3 antennas, L=2 paths, and $E_b/N_0$=20 dB are assumed.

FIG. 13A shows the corresponding simulation BER results for four inventive smart antenna algorithms when M=3 antennas are employed under L=2 equal strength Jake multi-path fading. Theoretical smart antenna (using Eqs. (35), (37)) and conventional array antenna BER results (using Eqs. (36), (37)) are also shown for comparisons. Incident angles from users are uniformly distributed in a sector. It is observed that all four smart antenna algorithms perform almost equally. Maximum output power criteria yields the best performance than others. The simplified inventive smart antenna based on the maximum SINR criteria without eigenvector finding is the worst. BER results of all smart antenna algorithms are close to the theoretical one, and show significant capacity improvement compared to the conventional array antenna. For example, the CDMA with M=3 smart antenna processing can support 24 users while the conventional antenna array with M=3 supports only 10 users at $3\times10^{-2}$ BER under L=2 equal strength Jake multi-path fading.

Figure 13B:
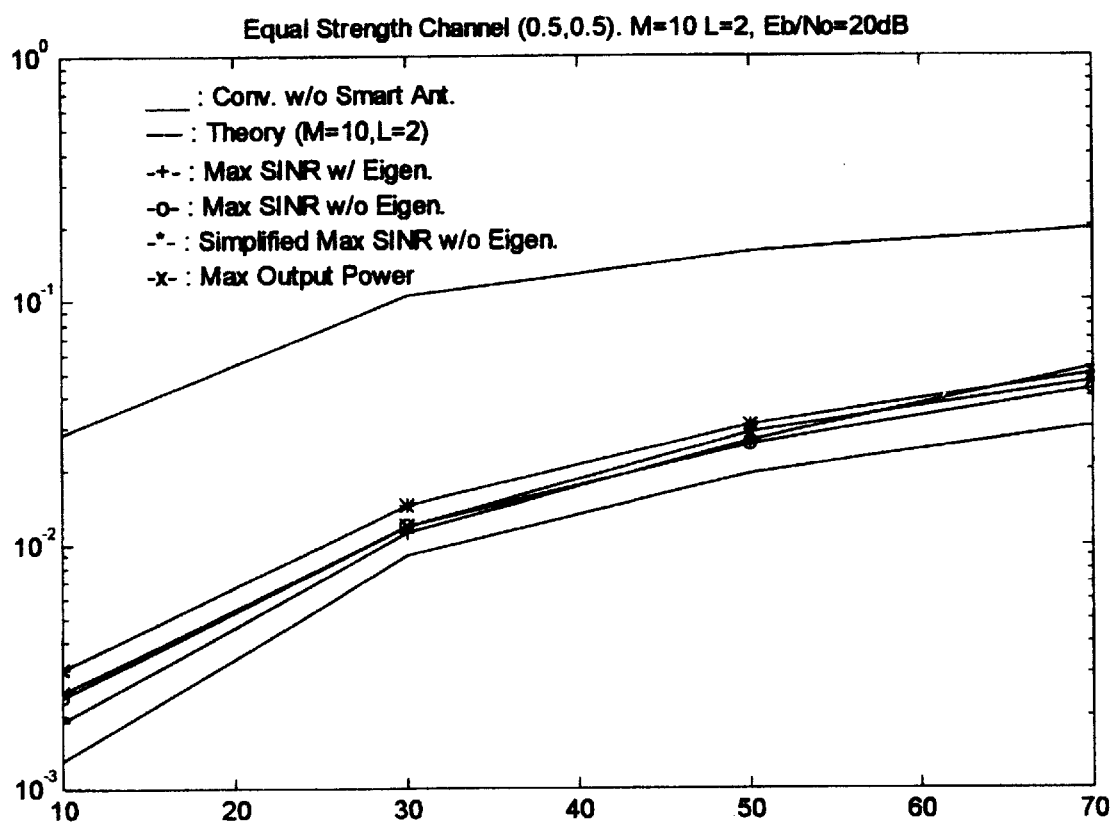
FIG. 13B shows a graph of the BER results for the smart antennas under equal strength multi-path fading wherein M=10 antennas, L=2 paths, and $E_b/N_0$=20 dB are assumed.

FIG. 13B shows the corresponding simulation BER results for four inventive smart antenna algorithms when M=10 antennas are employed. Significant capacity improvement is observed, compared to the conventional array antenna. For example, the CDMA with M=10 smart antenna processing can support 57 users while the conventional antenna array with M=10 supports only users at $3\times10^{-2}$ BER under L=2 equal strength Jake multi-path fading. FIG. 20 lists the simulation and theoretical BER results corresponding to ones in FIGS. 13A and B.

Figure 14A:
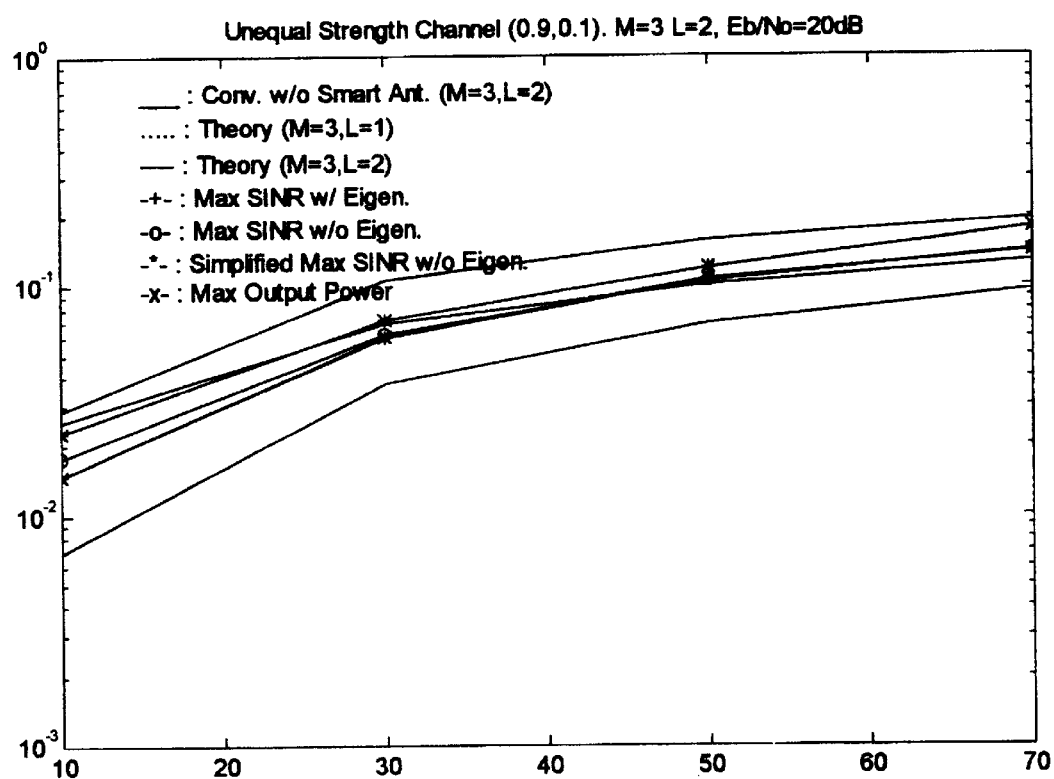
FIG. 14A shows a graph of the BER results for the smart antennas under unequal strength multi-path fading with $\overline{\alpha_{l=1}{}^2}$=0.9 and $\overline{\alpha_{l=2}{}^2}$=0.1 wherein M=3 antennas, L=2 paths, and $E_b/N_0$=20 dB are assumed.

FIG. 14A shows the corresponding simulation BER results for four inventive smart antenna algorithms under unequal strength multi-path with $\overline{\alpha_{l=1}^2}=0.9$ and $\overline{\alpha_{l=2}^2}=0.1$ when M=3. Theoretical smart antenna BER results are for equal strength with (M=3, L=1) and (M=3, L=2). Conventional array antennas with (M=3, L=2) are also shown for comparisons. It is observed that all four smart antenna simulation BER results under unequal strength fading are close to theoretical smart antenna BER results with L=1 path fading. This is reasonable because the finger output from the strong path with strength 0.9 is dominant, compared to the weak path finger. It is also observed that as the number of users increases, the smart antenna based on the maximum output power criteria using Eqs. (10)–(11) without Lagrange multiplier is slightly better than other smart algorithms. As the number of users decreases, the smart antenna based on the maximum SINR criteria using Eqs. (16)–(23) with eigenvector finding is slightly better than other smart algorithms. The smart antenna algorithm based on the maximum SINR criteria with eigenvector finding takes 8 symbols per snapshot while other smart antenna algorithms employ an instantaneous update, i.e., one symbol per snapshot.

Figure 14B:
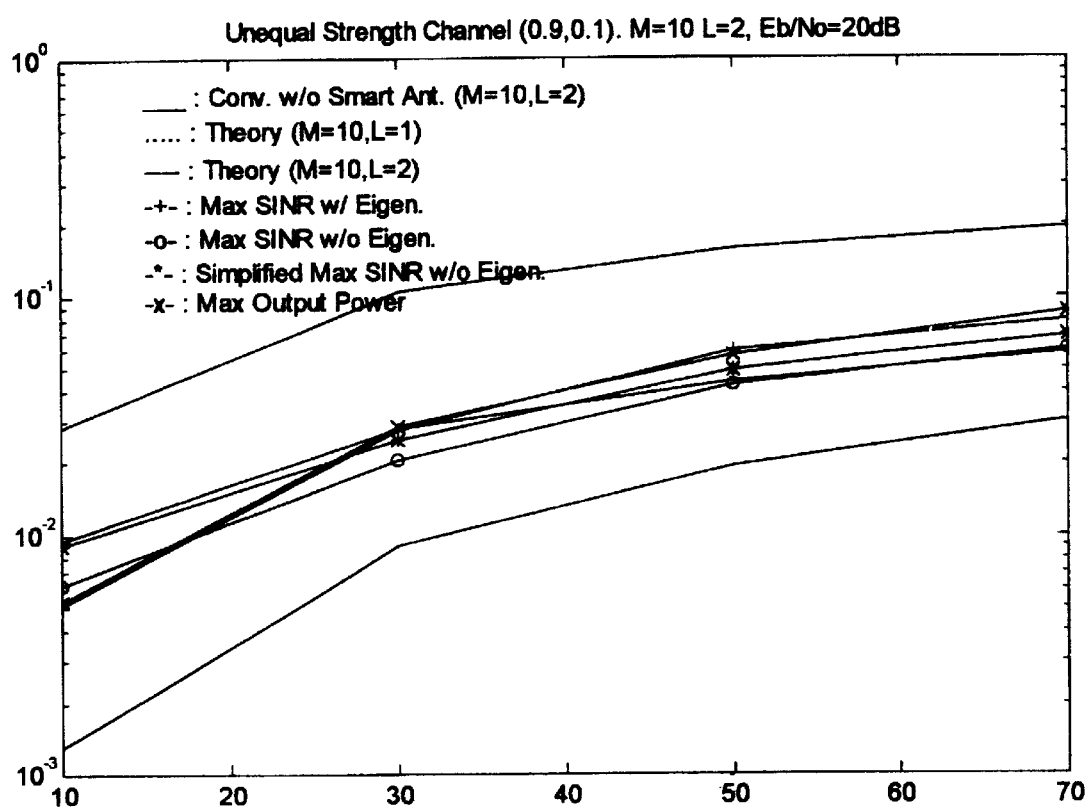
FIG. 14B shows a graph of the BER results for the smart antennas under unequal strength multi-path fading with $\overline{\alpha_{l=1}{}^2}$=0.9 and $\overline{\alpha_{l=2}{}^2}$-0.1 wherein M=10 antennas, L=2 paths, and $E_b/N_0$=20 dB are assumed.

FIG. 14B shows the corresponding simulation BER results for the four inventive smart antenna algorithms under unequal strength multipath with $\overline{\alpha_{l=1}^2}=0.9$ and $\overline{\alpha_{l=2}^2}=0.1$ when M=10. It is observed that as the number of users increases, the smart antenna based on the maximum SINR output criteria using Eqs. (24)–(26) without eigenvector finding is better than other smart algorithms. FIG. 21 lists the simulation and theoretical BER results corresponding to ones in FIGS. 14A and B.

Figure 15A:
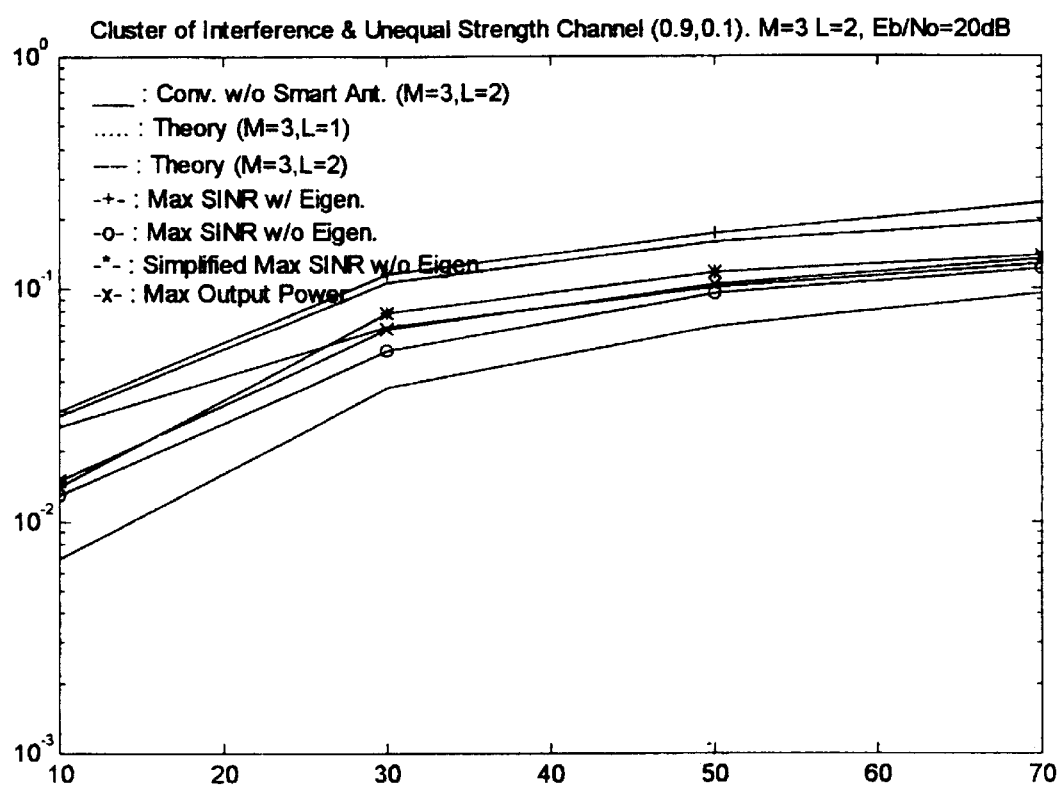
FIG. 15A shows a graph of the BER results for the smart antennas under a cluster of interference and unequal strength multi-path fading with $\overline{\alpha_{l=1}{}^2}$=0.9 and $\overline{\alpha_{l=2}{}^2}$=0.1 wherein M=3 antennas, L=2 paths, and $E_b/N_0$=20 dB are assumed.

FIG. 15A shows the corresponding simulation BER results for M=3 by assuming that all other users are located in a cluster region and their incident angles are within ±5° from 25°. The four inventive smart antenna algorithms are also considered under unequal strength multipath with $\overline{\alpha_{l=1}^2}=0.9$ and $\overline{\alpha_{l=2}^2}=0.1$. The conventional antenna with (M=3, L=2) but without smart antenna algorithm is shown for comparison. Theoretical smart antenna BER results with (M=3, L=1) and (M=3, L=2) are also shown for equal strength fading. It is observed that the smart antenna based on the maximum SINR criteria using Eqs. (16)–(23) with eigenvector finding can be worse than the theoretical smart antenna BER results with L=1 and the conventional antenna with (M=3, L=2) as the number of users increases. The smart antenna based on the maximum SINR criteria using Eqs. (24)–(26) without eigenvector finding may yield better BER results than the other algorithms.

Figure 15B:
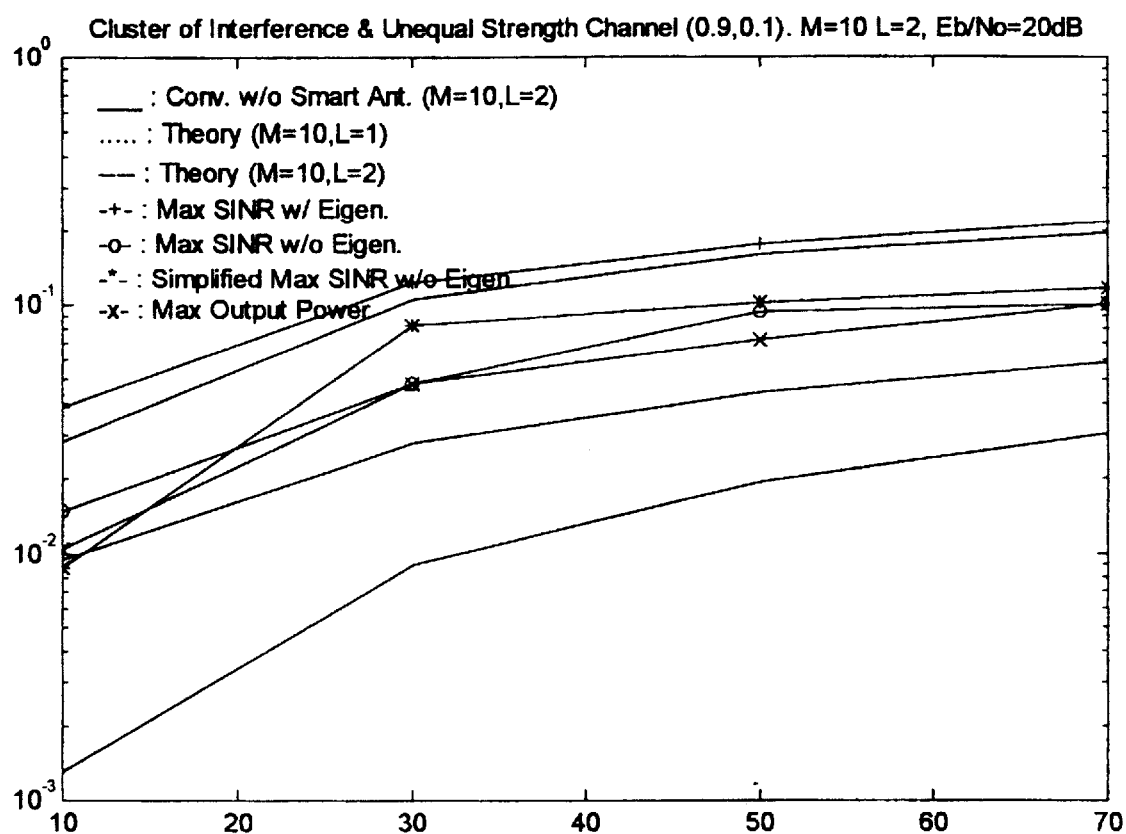
FIG. 15B shows the BER results for the smart antennas under a cluster of interference and unequal strength multi-path fading with $\overline{\alpha_{l=1}{}^2}$=0.9 and $\overline{\alpha_{l=2}{}^2}$=0.1 wherein M=10 antennas, L=2 paths, and $E_b/N_0$=20 dB are assumed.

FIG. 15B shows the corresponding simulation BER results for M=10 by assuming that all other users are located in a cluster region and their incident angles are within ±5° from 25°. The smart antenna based on the maximum SINR criteria using Eqs. (16)–(23) with eigenvector finding can be worse than the conventional antenna with (M=10, L=2). The smart antenna based on maximum output power criteria is the best. FIG. 22 lists the simulation and theoretical BER results corresponding to ones in FIGS. 15A and B.

Figure 16:
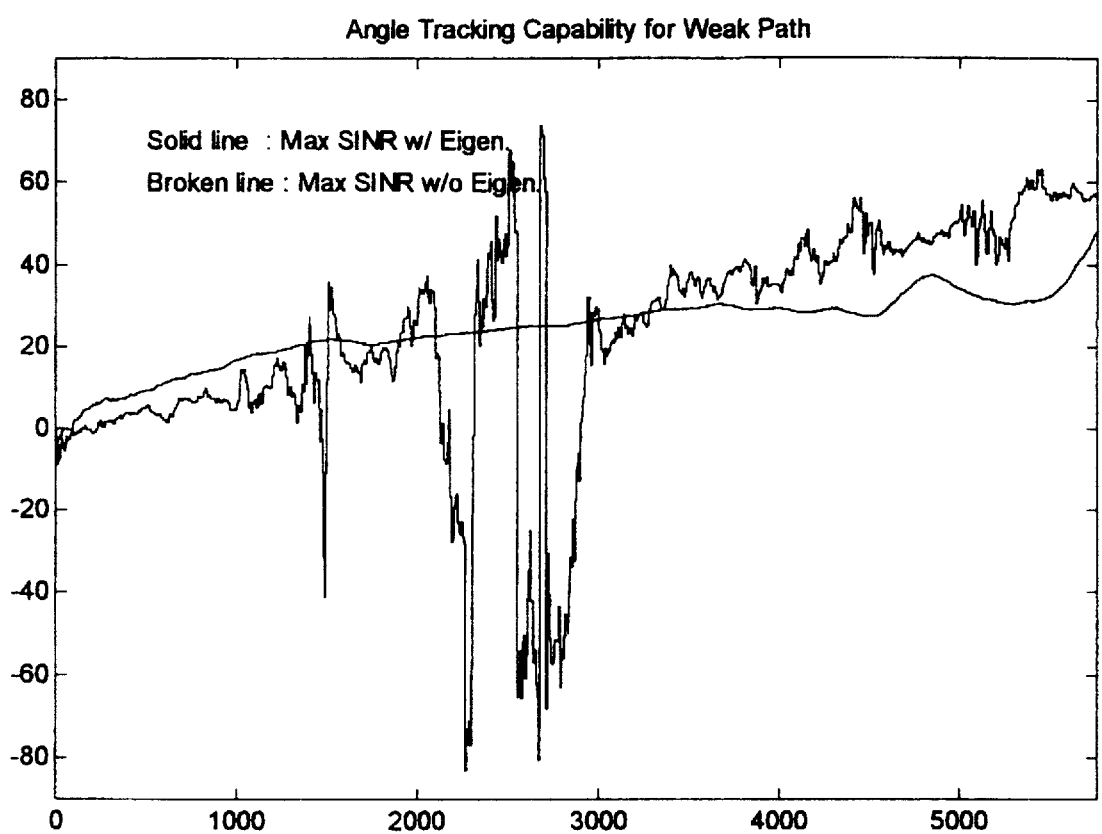
FIG. 16 shows a graph of an angle tracking behavior of the weak path for the smart antennas under a cluster of interference and unequal strength multipath fading with $\overline{\alpha_{l=1}{}^2}$=0.9 and $\overline{\alpha_{l=2}{}^2}$=0.1 wherein M=3 antennas, L=2 paths, and $E_b/N_0$=20 dB are assumed.
Figure 17:
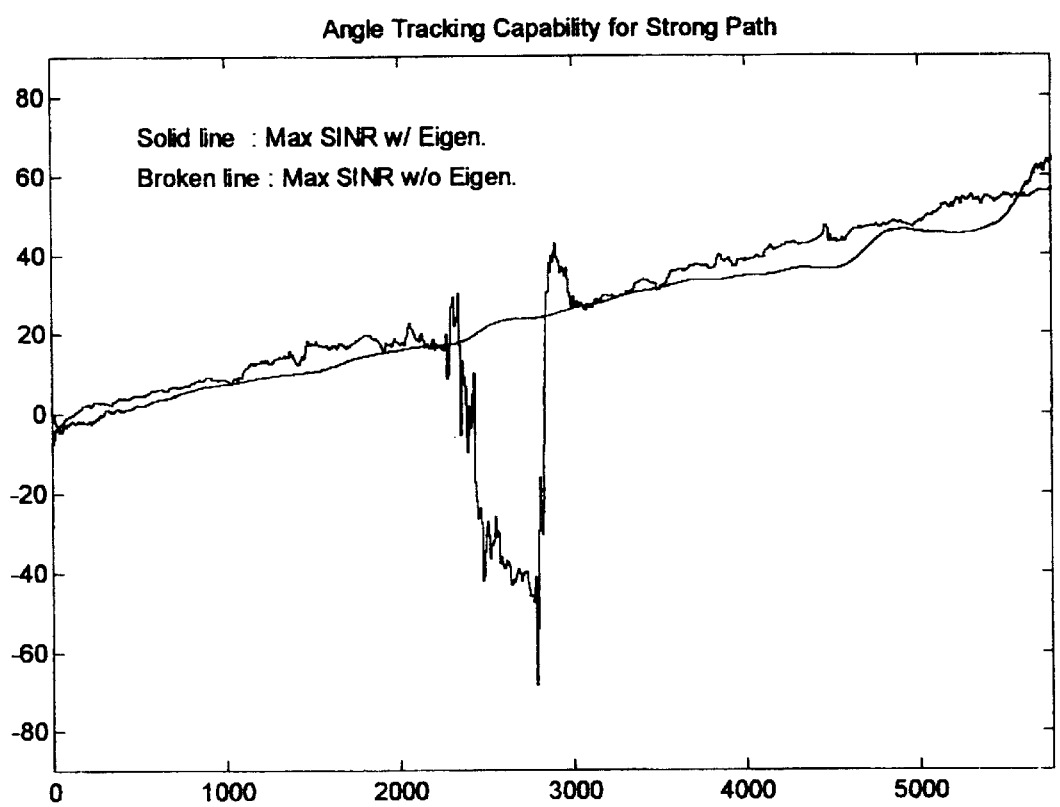
FIG. 17 shows a graph of an angle tracking behavior of the strong path for the smart antennas under a cluster of interference and unequal strength multipath fading with $\overline{\alpha_{l=1}{}^2}$=0.9 and $\overline{\alpha_{l=2}{}^2}$=0.1 wherein M=3 antennas, L=2 paths, and $E_b/N_0$=20 dB are assumed.

FIGS. 16 and 17 demonstrate the corresponding behaviors of the antenna tracking angles for the weak and strong path, respectively, when the incident angle of the desired path signal changes from 0° to 60° linearly and all interference incident angles are within ±5° from 25°. Both the smart antenna algorithms based on the maximum SINR output criteria with and without eigenvector finding are employed. These FIGS. demonstrate why the three inventive algorithms can yield better BER than the other inventive algorithm based on the maximum SINR with eigenvector, which is equivalent to the algorithm in the article of Ayman F. Naguib et al. FIGS. 16 and 17 show that the angle tracking capability of the inventive algorithm based on the maximum SINR without eigenvector finding can be better than that with eigenvector finding when the incident angles of the interference signals are close to that of the desired signal, i.e., snapshot index from 2000 to 3000 in FIGS. 16 and 17. This is because the inventive algorithm without eigenvector finding employs small convergence parameter $\mu=0.0001$ and the update increment for the weight vector is small while the other inventive algorithm with eigenvector finding, which is equivalent to that in the article of Ayman F. Naguib et al., does not employ any convergence parameter. The update increment can be large and the resulting angle may be out of track.

Conclusions

Complex (cross) PN spreading and de-spreading were respectively employed at the mobile transmitter and a base station receiver according to the cdma2000 reverse link configuration. In addition, pilot channel was employed as specified in the cdma2000 reverse link. It was observed that BER degradation due to the pilot channel estimation is insignificant compared to BER with perfect channel estimation when the estimation window size is 128 chips per symbol for a smart antenna with M=3 antennas under L=2 equal strength multipath fading.

Four inventive smart antenna algorithms were employed for the pilot-aided CDMA system with cross PN spreading and de-spreading: (1) a smart antenna based on the maximum output power criteria with no Lagrange multiplier; (2) a smart antenna based on the maximum output SINR criteria with eigenvector finding which requires less computation but equivalent BER as one in the article of Ayman F. Naguib et al.; (3) a smart antenna based on the maximum output SINR criteria without eigenvector finding; and (4) a more simplified smart antenna based on the maximum output SINR criteria without eigenvector finding. For practical channel models, equal and unequal strength multipath fading were used with Jake model. Also, a cluster of interfering users and scattered interference users were considered. Both theoretical and simulation BER results were obtained for comparisons.

It was observed that both a smart antenna based on the maximum output power criteria with no Lagrange multiplier and a smart antenna based on the maximum output SINR criteria without eigenvector finding can perform better than others. In addition, it was found that the three inventive smart antenna algorithms could show better BER performance than one in the article of Ayman F. Naguib et al. when interfering users are clustered and channels are unequal strength fading. Furthermore, computation loads of three inventive algorithms per snapshot are significantly smaller than the existing ones. Therefore, the three inventive smart antenna algorithms may be recommended for 3G and future CDMA systems to increase capacity with reasonable and practical computational loads.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

Appendix

MATLAB software version 5.0 was used for simulation. And some functions, which are not in MATLAB version 5.0, were built in.

```
%%%%%%%%%%%%%%%%%%%%%%%%%%%%%%%%%%%%%%%%
%%% Conventional antennas simulation code %%%
%%%%%%%%%%%%%%%%%%%%%%%%%%%%%%%%%%%%%%%%

%% CHOOSE MODE FOR INTERFERENCE MODELING %
% 1:Practical  2:Simp. Modeling %%
MODEL=2 f_max=500  %# of frame
M=3        %# of antennas
L=2        %# of multipaths

ChnnlStrnth=sqrt([0.5 0.5]) %Unequal/Equal Channel strength

EbNo=20
Ao=sqrt(8);  %pilot channel strength
Ec=1.0;      %chip energy
Nf=384;      %the number of code symbols/frame
```

```
        Nc=64*384;  %the number of chips/frame = 24576 %
        Np=64*4;    %# of chips to estimate pilot sequence
        PG=64;      %Processing Gain
        Ns=64;      %# of chips/bit
5       V=50;       %Mobile Speed km/hr Pb=[];
        wn=1:Nc;  walsh=rem(wn,2)*2-1;%Generate   +/-   1   walsh
    chips%
10      var_gn=0.5*Ns/10^(EbNo/10);   %Variance  of  Gaussian
    Noise for N=10:20:70
            acumBerr=zeros(L+1,1);Error=zeros(L+1,1);
15  BER=zeros(L+1,1);
            var_oth=N-1;%Simp. Interference var.
            for frame=1:f_max
                %%% TRANSMITTER %%%
                dQ=round(rand(1,Nf))*2-1;    %Information Bit
20              aI=(round(rand(1,Nc))*2-1;   %Generating  PN  code
    for I ch.
                aQ=(round(rand(1,Nc))*2-1;   %Generating  PN  code
    for Q ch.
                %Transmitted Signal
25              s=sqrt(Ec)*(upsamp2(dQ,Ns).*walsh+Ao).*aI...
                    +i*sqrt(Ec)*(upsamp2(dQ,Ns).*walsh+Ao).*aQ;
                %%% CHANNEL %%%
```

49

```
                [alpha,xc,xs]=LJake(V,frame+5000,L); %multipath
        Channel
                r=ones(L,1)*real(s).*xc'+i*ones(L,1)*imag(s).*xs';
                %%% RECEIVER %%%
 5              uL={};
                for l=1:L
                    if MODEL==1 %Practical Interference Model%
                        OchII=0;OchQQ=0;
                        for n=2:N
10                          OchII=OchII+ones(M,1)*(round(rand(1,Nc))*2-
        1);

OchQQ=OchQQ+ones(M,1)*(round(rand(1,Nc))*2-1);
                        end
15                  elseif MODEL==2 %Simplified Interference Model%
                        OchII=ones(M,1)*sqrt(var_oth)*randn(1,Nc);
                        OchQQ=ones(M,1)*sqrt(var_oth)*randn(1,Nc);
                    end 20                  %%% Generating AWGN %%%
                    nI=sqrt(var_gn)*randn(M,Nc); %Gaussian Noise
                    nQ=sqrt(var_gn)*randn(M,Nc); %Gaussian Noise %%% Received signal for Pre-PN despreading%%
25
        xI=ones(M,1)*real(r(l,:))*ChnnlStrnth(l)+OchII+nI;
```

50

```
        xQ=ones(M,1)*imag(r(1,:))*ChnnlStrnth(1)+OchQQ+nQ;
           x=xI+i*xQ;
           %%% Post PN despreading%%%
5          y=xI.*(ones(M,1)*aI)+i*(xQ.*(ones(M,1)*aQ));

%%% Pilot Channel Estimation %%%
           EstMt=phaest2(y,Np,Np,Ao*Np*sqrt(Ec))*factor;
           Y=real(y).*real(EstMt).*(ones(M,1)*walsh)
10
+imag(y).*imag(EstMt).*(ones(M,1)*walsh);

%%% Take sumation for Ns interval for bit
decision %%%
15         uL=phaest2(Y,Ns,1,1);
           ulM=sum(uL,1);  %path output from each antenna
           uL=[uL;ulM];    %multi-path output%
        end
        UL=sum(uL,1); %sum every multi-path%
        %%% BIT DECISION %%%
20      rvdBit=hardlims([uL;UL]);
        Error=sum((ones(L+1,1)*dQ)~=rvdBit,2);
        acumBerr=acumBerr+Error;%Accumulate Bit Error
     end
25   BER=acumBerr/(Nf*f_max);
     Pb=[Pb BER];
  end
```

```
%%%%%%%%%%%%%%%%%%%%%%%%%%%%%%%%%%%%%%
%%% SmtAnt simulation code %%%%%%%%%%%%%
%%%%%%%%%%%%%%%%%%%%%%%%%%%%%%%%%%%%%% f_max=500   %# of frame
M=3         %# of antennas
L=2         %# of multipaths

%%% CHOOSE MODE FOR ADAPTIVE ALGORITHM %%%
% 1:Max Output       2:Max SINR w/ Eig
% 3:Max SINR w/o Eig 4:Simp.Max SINR w/ Eig %
MODE=3
%%% CHOOSE MODE FOR INTERFERENCE MODELING %%%
%%% 1:Practical  2:Simp. Modeling %%%%%%%%%
MODEL=2
%%% CHOOSE CHANNEL MODELING %%%%%%%%%%%%%%%%%
% 1:Equal   2:Unequal %%%%%%%%%%%%%%%%%%%
CHANNEL=2
%%% Testing Interferencing Cluster %%%%%%%%%%
% 1:Equally Distributed 2:Cluster of Interference
CLUSTER=2 if CHANNEL==1
    ChnnlStrnth=ones(1,L)/sqrt(L)
elseif CHANNEL==2
```

```
        ChnnlStrnth=sqrt([0.9 0.1])
    end

MU=0.0001*ones(1,L)      %For SK1sinr Algorithms
    %MU=0.00005*ones(1,L)    %For SK2sinr Algorithms % update weight vector every ANp bits %
    if MODE==2
        ANp=8
    else
        ANp=1
    end EbNo=20
    Ao=sqrt(8);
    Ec=1.0;
    Nf=384;    % # of bit/frame
    Nc=64*384;   %  = 24576 %
    Np=64*4;     % # of chips for pilot estimation
    PG=64;     %Processing Gain
    Ns=64;     %# of chips/bit
    V=50;        %Mobile Speed km/hr
    FgtFact=0.9; %forgetting factor
    d_theta=0.01*pi/PG/180; %mobile angle increment/chip Pb=[];
    incrmnt=d_theta:d_theta:d_theta*PG*Nf; %angle increment%
```

```
        wn=1:Nc;  walsh=rem(wn,2)*2-1;%Generate   +/-    1    walsh
chips%
        var_gn=0.5*Ns/10^(EbNo/10);   %Variance    of    Gaussian
Noise%
     for N=10:20:70 acumBerr=zeros(L+1,1);Error=zeros(L+1,1);BER=zeros(L+1,1);
        TrckAng=[];   Ps=[];
        lambda=ones(1,L)*M;%Initial   Guess   for   Max.Output
Algorithm.
        wo=ones(M,L)/sqrt(M);%Initial   Guess   for   Max.Output
Algorithm.
        K=zeros(1,L);       %Initialization  for  SK(Proposed)
Alg.
        %Initial.for Max SINR Algrthm. %
        Rxx=zeros(M,M*L);Ryy=zeros(M,M*L);Ruu=zeros(M,M*L);

sign=(round(rand(L,N))*2-1);% Determine Angle Up/Down
        start=randn(L,N)*pi/3;   % Angle Starting Point var_oth=N-1;%Simp. Interference var.
        for frame=1:f_max
           %%%% TRANSMITTER %%%%
           dQ=round(rand(1,Nf))*2-1; %Information Bit
           aI=(round(rand(1,Nc))*2-1);%Generating PN code for
I ch.
```

```
        aQ=(round(rand(1,Nc))*2-1);%Generating PN code for
Q ch.
        %Transmitted Signal
        s=sqrt(Ec)*(upsamp2(dQ,Ns).*walsh+Ao).*aI...
            +i*sqrt(Ec)*(upsamp2(dQ,Ns).*walsh+Ao).*aQ;

%%% CHANNEL %%%
        [alpha,xc,xs]=LJake(V,frame+5000,L);%multipath    at
Channel
        r=ones(L,1)*real(s).*xc'+i*ones(L,1)*imag(s).*xs';

%%% RECEIVER %%%
        uL=[];
        for l=1:L
            if MODEL==1 %Practical Modeling%
                OchII=0;OchQQ=0;
                for n=2:N
                    if CLUSTER==1
                        [ang,sign(l,n),start(l,n)]=...
ramp2(sign(l,n),start(l,n),0.01*pi/180/64);
                    elseif CLUSTER==2
                        % angle is between 20 and 30
                        ang=(round(rand(1,Nc))*2-
1)*incrmnt+25*pi/180;
                    end
                    m=(0:M-1)'; aj=exp(-i*m*pi*sin(ang));
```

```
            OchII=OchII+ones(M,1)*(round(rand(1,Nc))*2-
1).*aj;
            OchQQ=OchQQ+ones(M,1)*(round(rand(1,Nc))*2-
1).*aj;
        end
    elseif MODEL==2 %Simplified Modeling%
        if CLUSTER==1
            %angle is between -pi/2 and pi/2%
            thetaj=rand(1,Nc)*pi-pi/2;
        elseif CLUSTER==2
            % angle is between 20 and 30
            thetaj=(rand(1,Nc)*10+20)*pi/180;
        end
        m=(0:M-1)'; aj=exp(-i*m*pi*sin(thetaj));

OchII=ones(M,1)*sqrt(var_oth)*randn(1,Nc).*aj;

OchQQ=ones(M,1)*sqrt(var_oth)*randn(1,Nc).*aj;
    end

%%% Generating AWGN %%%
        nI=sqrt(var_gn)*randn(M,Nc); %Gaussian Noise
        nQ=sqrt(var_gn)*randn(M,Nc); %Gaussian Noise %%% Steering Vector for Desired user signal%%%
        [ang,sign(1,1),start(1,1)]=...
            ramp2(sign(1,1),start(1,1),0.01*pi/180/64);
```

```
            m=(0:M-1)'; a=exp(-i*m*pi*sin(ang));

%%% Desired signal for Pre-PN despreading%%%

5   xI=ones(M,1)*real(r(1,:))*ChnnlStrnth(1).*a+OchII+nI;

xQ=ones(M,1)*imag(r(1,:))*ChnnlStrnth(1).*a+OchQQ+nQ;
            x=xI+i*xQ;
        %%% Post PN despreading%%%
10          y=xI.*(ones(M,1)*aI)+i*(xQ.*(ones(M,1)*aQ));

%%%%%%%%%%% Adaptive Algorithm %%%%%%%%%%%%%%
            if MODE==1
                %Max. Output Algrthm
15
     [W,wo,lambda]=moalgr(y,lambda,wo,ANp,Ns,FgtFact,1);
            elseif MODE==2
                %Max. SINR Algrthm
                [W,Rxx,Ryy,Ruu]=...
20                  mxsinr(x,y,ANp,Ns,FgtFact,1,Rxx,Ryy,Ruu);
            elseif MODE==3
                %Max. SINR Algrthm w/o Eigen.

[W,wo,K]=SK1sinr(x,y,ANp,Ns,FgtFact,1,wo,MU,K);
25          elseif MODE==4
                %Simp. Max. SINR Algrthm w/o Eigen.
```

57

```
            [W,wo,K]=SK2sinr(x,y,ANp,Ns,FgtFact,1,wo,MU,K);
                end
                R=W.*y;

%%% Pilot Channel Estimation %%%
                EstMt=phaest2(R,Np,Np,Ao*Np*sqrt(Ec));
                Y=real(R).*real(EstMt).*(ones(M,1)*walsh)...
                    +imag(R).*imag(EstMt).*(ones(M,1)*walsh);

%%% Take  sumation  for  Ns  interval  for  bit
    decision %%%
                ul=phaest2(Y,Ns,1,1);
                ulM=sum(ul,1);  %path output from each antenna
                uL=[uL;ulM];  %multi-path output%
              end
              UL=sum(uL,1); %sum every multi-path%

%%%%%%%%%%%%%%%%%%                                BIT
    DECISION %%%%%%%%%%%%%%%%%%%%%%
                rvdBit=hardlims([uL;UL]);
                Error=sum((ones(L+1,1)*dQ)~=rvdBit,2);
                acumBerr=acumBerr+Error;%Accumulate Bit Error
            end
          BER=acumBerr/(Nf*f_max);
          Pb=[Pb BER];
        end
```

```
%%% function to generate L multipaths %%% function [alpha, xxc, xxs] = LJake(V, frame, L)
```

```
            Samples = 3072;
            Ns = 24576/Samples;

xxc = [];
 5          xxs = [];
            for i = 0:L-1
            if V
                    No = 1*8;
                    Tc = 1/1228800;    % chip Time Interval
10                  Nc = 1;
                    Fc = 900*10^6;
                    fD = V*1000/3600*Fc/300; % Doppler frequency
                    Nn = 4*No+2;
                    wm = 2*pi*fD;
15                  n = 1:No;
                    wn = wm*cos(2*pi*n/Nn);  % Vector size = No
                    beta = pi*n/(No+1);      % Vector size = No
                    t = linspace(0, .02, Samples);

20                  sumc = cos(beta)*cos(wn'*(t+frame*.02+i*999)*Tc/Nc);
                    sums = sin(beta)*cos(wn'*(t+frame*.02+i*999)*Tc/Nc);
                     xc = 2*sumc...
                        + 1.414213562*cos(wm*(t+frame*.02+i*999)*Tc/Nc);
                     xs = 2*sums;
25                   xc = xc/sqrt(2*No);
                   xs = xs/sqrt(2*(No+1));
                   xc = upsamp2(xc, Ns)';
```

```
            xs = upsamp2(xs, Ns)';
            %alpha = upsamp(alpha, 24576/Samples);
            xxc = [xxc xc];
            xxs = [xxs xs];
5       else
            xc=ones(Samples*Ns,1);
            xxc = [xxc xc];
            xs=ones(Samples*Ns,1);
            xxs = [xxs xs];
10      end
        %alpha = sqrt(xc.^2 + xs.^2);
        end % for i
        alpha = sqrt(xxc.^2 + xxs.^2);

15

%%% function for Max. Output Adaptive Algorithm %%% function[output,wo,lambda]=moalgr(input,lambda,wo,upt,Ns,
20      f,path)
        % moalgr.m
        % [output] = moalgr(input,lambda,upt,Ns,f,L,l)
        % maximum output adaptive algorithm
        % By Yoo S. Song
25
        [row,col]=size(input);
```

```
        R=phaest2(input,upt*Ns,1,1);   %Accumulate    chips    for
upt*Ns mount
        W=[];
        w=wo(:,path);
5       lamb=lambda(1,path);
        for k=1:col/(upt*Ns)
            z=w'*R(:,k);
            lamb=f*lamb+z*z';
            w=w+(R(:,k)-w*z)*z'/lamb;
10          w=w/w(1);
            W=[W conj(w)];
        end
        wo(:,path)=w;
        lambda(1,path)=lamb;
15
        output=upsamp2(W,upt*Ns);
```

```
%%% function for Max. SINR Adaptive Algorithm %%% function [output,Rxx,Ryy,Ruu]
        = mxsinr(x,input,upt,Ns,f,path,Rxx,Ryy,Ruu)

% maximum SINR adaptive algorithm w/ Eigen.
% By Yoo S. Song

[row,col]=size(input);
n=1+row*(path-1):1:row*path;
rxx=Rxx(:,n);   ryy=Ryy(:,n);   ruu=Ruu(:,n);
y=phaest2(input,Ns,1,1);
W=[];
Nf=col/Ns;
for k=1:Nf/upt
    t1=1+upt*Ns*(k-1):upt*Ns*k;
```

```
        rxx=f*rxx+x(:,t1)*x(:,t1)';
        t2=1+upt*(k-1):upt*k;
        ryy=f*ryy+y(:,t2)*y(:,t2)';
        [tmpW,eigv]=pwrmthd(rxx-ryy,100,row);
        tmpW=tmpW/tmpW(1);
        ruu=f*ruu+Ns*(rxx-ryy/Ns)/(Ns-1);
        w=inv(ruu)*tmpW;
        W=[W conj(w)];
    end
    n=1+row*(path-1):1:row*path;
    Rxx(:,n)=rxx;   Ryy(:,n)=ryy;   Ruu(:,n)=ruu;
    output=upsamp2(W,Ns*upt);
```

```
%%% function for Max. SINR Adaptive Algorithm w/o
Eigen %%% function              [output,wo,K]              =
SK1sinr(x,input,upt,Ns,f,path,wo,MU,K)

% maximum SINR adaptive algorithm w/o Eigen.
% By Yoo S. Song

[row,col]=size(input);
y=phaest2(input,upt*Ns,1,1);
W=[];
Nf=col/Ns;
w=wo(:,path);
D=K(1,path);
mu=MU(1,path);
for k=1:Nf/upt
    t=1+upt*Ns*(k-1):upt*Ns*k;
    Rxx=x(:,t)*x(:,t)';
    z=w'*y(:,k);
    D=upt*Ns*w'*Rxx*w-z'*z+f*D;
    w=w+2*mu*(upt*Ns-1)*((z'*D+z'*z'*z)*y(:,k)...
        -upt*Ns*z'*z*Rxx*w)/D^2;
```

```
    w=w/w(1);
    W=[W conj(w)];
end
wo(:,path)=w;
K(1,path)=D;

output=upsamp2(W,upt*Ns);
```

%% function for Simp. Max. SINR Adaptive Algorithm w/o Eigen %%

```
function [output,wo,K]
    = SK2sinr (input1,input2,upt,Ns,f,path,wo,MU,K)

% Simpl.maximum SINR adaptive algorithm w/o Eigen.
% By Yoo S. Song

[row,col]=size(input2);

x=phaest2(input1,upt*Ns,1,upt*Ns);
y=phaest2(input2,upt*Ns,1,1);
W=[];
Nf=col/Ns;
w=wo(:,path);
D=K(1,path);
mu=MU(1,path);
for k=1:Nf/upt
    g=w'*x(:,k);
    z=w'*y(:,k);
    D=upt*Ns*g'*g-z'*z+f*D;
    w=w+2*mu*(upt*Ns-1)*((z'*D+z'*z'*z)*y(:,k)...
        -upt*Ns*z'*z*g*x(:,k))/D^2;
    w=w/w(1);
    W=[W conj(w)];
end
```

```
wo(:,path)=w;
K(1,path)=D;

output=upsamp2(W,upt*Ns);
```

```
%%% function for pilot channel estimation %%% function [output] = phaest2(input,numest,repeat,division)

% phaest.m
% [output] = phaest(input,row,col,numest,repeat,division)
```

```
% Phase estimation
% By Y.S Song

[row,col]=size(input);
5       step2=[];
        for m=1:row
            step1=reshape(input(m,:),numest,col/numest);
            step2=[step2;upsamp2((sum(step1)/division),repeat)];
        end
10      output=step2;

%%%%%%%%%%%%%%%%%%%%%%%%%%%%%%%%%%%%%%%%%%%%%%%%%%%
15      %%%%%%

%%% function to find eigenvector and eigenvalues %%%

20      function [U,V] = pwrmthd(A,rpt,m)
        % pwrthd.m
        % [Eigv, Eig] = pwrmthd(input,repeat,demension)
        % power method for computing eigenvector
        % By Yoo S. Song
25
        U=ones(m,1);
        for n=1:rpt
```

```
        V=A*U;
        U=V/max(V);
    end
    U;
    V;

%%% function to generate continuously changing angle %%% function [output,sgn,st] = ramp2(sgn,st,stepsize)
    % increasing number to triangle number
    % By Yoo S. Song m=1:64*384;
    output=m*stepsize*sgn+st;
    if (output(64*384)>pi/2|output(64*384)<-pi/2)
        sgn=sgn*(-1);
    end
    st=output(64*384);
```

```
%%%%%%%%%%%%%%%%%%%%%%%%%%%%%%%%%%%%%%%%%%%%%%%%%%
%%%%%%

%%% function for upsampling %%% function [output] = upsamp2(input, upfactor);
% Up-sampling a vector or matrix by a constant factor
% Sirote Ratanamahatana (modified version)

[m,n] = size(input);
output = [];

b = ones(upfactor,1);
for j = 1:m
   temp = b*input(j,:);
   output = [output;reshape(temp,1,n*upfactor)];
end
```

```
%%%%%%%%%%%%%%%%%%%%%%%%%%%%%%%%%%%%%%%%%%%
%%% Computing Theoretical Bit Error Rate %%%
%%%%%%%%%%%%%%%%%%%%%%%%%%%%%%%%%%%%%%%%%%%

% Choose mode 1: for Smt.Ant. or 2: Conv.Ant. %
MODE=2

Eb=1;
G=64;
EbNo=20
M=10
L=2

% BER of ant. diverisity & interference down %
for N=10:20:70 % dB %
    N
```

```
              Pn_in=0.5*1/10^(EbNo/10);
              Pi_in=N-1;

if MODE==1    %Smt.Ant.%
 5               for theta=0:1:179
                   m=(0:M-1)';
                     a1=cos(pi*m*sin((theta-90)*pi/180))...
                        +i*sin(pi*m*sin((theta-90)*pi/180));
                   for phi=0:1:179
10                   m=(0:M-1)';
                       an=cos(pi*m*sin((phi-90)*pi/180))...
                          +i*sin(pi*m*sin((phi-90)*pi/180));
                     gain1(phi+1)=abs((a1'*an))^2/M^2;
                   end
15                 gain2(theta+1)=mean(gain1);
                   sir_gain=gain2(theta+1);

Ps=1;
                   Pi=Pi_in*sir_gain/G;
20                 Pn=Pn_in/M;

SINR=Ps/(Pn+Pi);
                     rho=SINR/2/L;

25                 p=0.5*(1-sqrt(rho/(1+rho)));
                   sm=0;
                   for l=0:L-1
```

73

```
                sm=(1-p)^l*Factorial(L+l-1)...
                    /Factorial(l)/Factorial(L-1)+sm;
            end
            Pb(theta+1)=p^L*sm;
        end
        Avg_pro=mean(Pb)
    end
    if MODE==2    %Conv.Ant.%
        Ps=1;
        Pi=Pi_in/G;
        Pn=Pn_in/M;

SINR=Ps/(Pn+Pi);
        rho=SINR/2/L;

p=0.5*(1-sqrt(rho/(1+rho)));
        sm=0;
        for l=0:L-1
            sm=(1-p)^l*Factorial(L+l-1)...
                /Factorial(l)/Factorial(L-1)+sm;
        end
        Pb=p^L*sm
    end
end
```

What is claimed is:

1. A method, for use in a smart antenna system, of generating a weight vector based on a maximum output power criteria without Lagrange multiplier wherein, the weight vector is applied after pseudo noise (PN) dispreading rather than in front of a receiver for channel estimation and data symbol demodulation, said method comprising the steps of:

setting an initial weight vector w(0) and an initial eigenvalue λ(0);

receiving new post-PN processing data y(k); and updating the weight vector w(k) at a snapshot index k as:

$$\underline{w}(k) = \underline{w}(k-1) - \frac{1}{2}\frac{1}{\lambda(k)}\nabla(k)$$
$$= \underline{w}(k-1) + [\underline{y}(k) - \underline{w}(k-1)z(k)]\frac{z^*(k)}{\lambda(k)}$$
$$\underline{w}(k) = \frac{\underline{w}(k)}{w_1(k)}$$

where ∇(k) is a M×1 gradient vector of a cost function, * is the conjugate operation, λ(k) is the eigenvalue of an auto-covariance matrix $R_{yy}(k)$, $w_1(k)$ is the first element of w(k), and z(k) is an array output expressed as:

$$z(k)=w^H(k-1)y(k),$$

where H denotes a conjugate transpose.

2. The method as recited claim 1, wherein, if the initial weight vector w(0) is set to $(1, \ldots, 1)^T$, the eigenvalue λ(k) is updated as:

$$\lambda(k)=f\lambda(k-1)+|z(k)|^2$$

where f is a forgetting factor that set to 0.9 and the initial eigenvalue λ(0) is set to M.

3. The method as recited claim 2, wherein w(k) which is an optimal array weight vector approaches a principal eigenvector of the autocorrelation matrix of y(k) when a signal-to-interference-plus-noise output power ratio (SINR) is sufficient; and the cost function is as:

$$J(w(k))=E\|y(k)-w(k)w^H(k)y(k)\|^2=tr(R_{yy}(k))-2tr(w^H(k)R_{yy}(k)w(k))+tr(w^H(k)R_{yy}(k)w(k)w^H(k)w(k))$$

where tr is a trace operation and $R_{yy}(k)$ is an auto-correlation matrix.

4. The method as recited in claim 3, wherein the auto-correlation matrix is expressed as:

$$R_{yy}(k) = E\left\{ \begin{pmatrix} y_{l,m=1}(k) \\ \vdots \\ y_{l,m=M}(k) \end{pmatrix} \begin{pmatrix} y_{l,m=1}(k) \\ \vdots \\ y_{l,m=M}(k) \end{pmatrix}^H \right\}.$$

5. The method as recited in claim 4, wherein the mean square error $E[\|y(k)-w(k)w^H(k)y(k)\|^2]$ becomes zero when the weight vector is optimum if the weight vector w(k) is proportional to an arrival channel vector a(k).

6. The method as recited in claim 5, wherein the power of the array output z(k) is maximized if the weight vector w(k) minimizes the cost function.

7. A method, for use in a smart antenna system, of generating a weight vector based on a maximum signal-to-interference-plus-noise-output power ratio ($SINR_O$) criteria with an eigenvector finding technique, wherein the weight vector is applied after pseudo noise (PN) dispreading rather than in front of a receiver for channel estimation and data symbol demodulation, said method comprising the steps of:

receiving new post-PN processing vectors y(i) and new pre-PN processing vectors x(i);

setting a post-PN correlation signal vector y for a finger of a user at snapshot k as:

$$y(k)=s(k)+i(k)+n(k)=s(k)+v(k)$$

where s(k) is an M×1 desired user signal vector through fading channel; i(k) is an M×1 PN-spread interference signal vector; n(k) is an M×1 thermal noise vector; and v(k)=i(k)+n(k) is an interference plus noise vector;

calculating an optimum weight vector w(k) as:

$$w(k)=\zeta R_{vv}^{-1}(k)a(k)$$

$$\underline{w}(k) = \frac{w(k)}{w_1(k)} \text{ where}$$

$$R_{vv}(k) = \frac{G}{G-1}\left(R_{xx}(k) - \frac{1}{G}R_{yy}(k)\right),$$

where G is a PN spread processing gain; $R_{xx}(k)$ is an M×M autocorrelation matrix of M×1 vector x(k), which is a pre-PN de-spreading array sample vector; $R_{yy}(k)$ is an M×M autocorrelation matrix of M×1 vector y(k), which is a post-PN de-spreading array sample vector; and a(k) is a channel vector.

8. The method as recited in claim 7, wherein the channel vector is estimated as an eigenvector with a maximum eigenvalue of matrix $R_{yy}(k)-R_{xx}(k)$ since the channel vector a(k) is obtained as:

$$(R_{yy}(k)-R_{xx}(k))a(k)=\lambda a(k).$$

9. A method, for use in a smart antenna system, of generating a weight vector based on a maximum signal-to-interference-plus-noise output power ratio ($SINR_O$) criteria without an eigenvector finding technique, wherein the weight vector is applied after pseudo noise (PN) dispreading rather than in front of a receiver for channel estimation and data symbol demodulation, said method comprising the steps of:

setting an initial weight vector w(0) and a convergence parameter;

receiving new post-PN processing vectors y(i) and new pre-PN processing vectors x(i);

obtaining an autocorrelation matrix $R_{xx}(k)$ of a pre-PN de-spreading array sample vector x(k) based on samples in the current snapshot interval; and recursively updating an optimum weight vector by taking a gradient vector ∇(k) of a signal-to-noise ratio (SINR) with respect to w(k) wherein the optimum weight vector can be obtained as:

$$w(k) = w(k-1) + \frac{2(G-1)\mu}{D^2(k)}[\{D(k)+|z(k)|^2\}z^*(k)y(k) - G|z(k)|^2 R_{xx}(k)w(k-1)]$$

$$w(k) = \frac{w(k)}{w_1(k)}$$

where $\mu$ is a convergence parameter; G is the PN processing gain equal to a number of chips per symbol, z(k) is an array output; and $D(k) = Gw^H(k-1)R_{xx}(k)w(k-1) - |z(k)|^2$.

10. The method as recited in claim 9, wherein if an approximation of $R_{xx}(k)$ is expressed as:

$$R_{xx}(k) \approx x(k)x^H(k)$$

and a scalar g(k) is expressed as:

$$g(k) \equiv w^H(k-1)x(k),$$

the optimum weight vector is obtained as:

$$w(k) = w(k-1) + \frac{2(G-1)\mu}{C^2(k)}[\{C(k)+|z(k)|^2\}z^*(k)y(k) - G|z(k)|^2 g(k)x(k)]$$

$$C(k) = fC(k-1) + G|g(k)|^2 - |z(k)|^2$$

where f is a forgetting factor.

* * * * *